(12) United States Patent
Raslambekov

(10) Patent No.: US 11,723,750 B1
(45) Date of Patent: Aug. 15, 2023

(54) SYSTEMS AND METHODS FOR DETERMINING AN EDGE OF ORTHODONTIC APPLIANCES

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 17/980,868

(22) Filed: Nov. 4, 2022

(51) Int. Cl.
  *A61C 7/00* (2006.01)
  *G06T 17/00* (2006.01)
  *A61C 9/00* (2006.01)

(52) U.S. Cl.
  CPC .......... *A61C 7/002* (2013.01); *A61C 9/0046* (2013.01); *G06T 17/00* (2013.01)

(58) Field of Classification Search
  CPC ...... A61C 7/002; A61C 9/0046; G16H 20/40; G16H 30/20; G06T 17/00
  See application file for complete search history.

(56) References Cited

U.S. PATENT DOCUMENTS

| | | | |
|---|---|---|---|
| 10,695,147 B1 | 6/2020 | Raslambekov | |
| 10,751,149 B1 | 8/2020 | Raslambekov | |
| 10,842,594 B2 | 11/2020 | Janzadeh et al. | |
| 10,993,782 B1 * | 5/2021 | Raslambekov | A61B 5/4833 |
| 11,116,606 B1 | 9/2021 | Raslambekov | |
| 11,259,897 B1 * | 3/2022 | Raslambekov | G16H 30/20 |
| 11,328,809 B1 * | 5/2022 | Raslambekov | G16H 20/40 |
| 11,517,400 B1 * | 12/2022 | Raslambekov | G16H 20/40 |
| 2014/0295373 A1 | 10/2014 | Braegger et al. | |
| 2017/0100213 A1 * | 4/2017 | Kuo | G16H 20/40 |
| 2020/0000552 A1 * | 1/2020 | Mednikov | A61C 5/20 |
| 2021/0178654 A1 | 6/2021 | Li et al. | |
| 2021/0271225 A1 | 9/2021 | Sirovskiy et al. | |

OTHER PUBLICATIONS

U.S. Appl. No. 17/720,409, filed Apr. 14, 2022.
U.S. Appl. No. 16/704,718, filed Dec. 5, 2019.

* cited by examiner

*Primary Examiner* — Yogesh P Patel
(74) *Attorney, Agent, or Firm* — BCF LLP

(57) ABSTRACT

A method and a system for determining a configuration of an open edge for a set of orthodontic appliances are provided. The method comprises: receiving a 3D digital model representative of a surface of a subject's arch form including teeth and a gingiva; obtaining, in the 3D digital model, along a surface of the gingiva, a respective position for a given control point of a plurality of control points, the plurality of control points defining the open edge for a given one of the set of orthodontic appliances; determining, based on the positions of the plurality of control points, a respective vector of positioning values for each of the plurality of control points; storing the respective vector of positioning values for each of the plurality of control points for further use in determining a respective configuration of the open edge for each other one of the set of orthodontic appliances.

20 Claims, 10 Drawing Sheets

SYSTEMS AND METHODS FOR DETERMINING AN EDGE OF ORTHODONTIC APPLIANCES

FIELD

The present technology relates to systems and methods for manufacturing an orthodontic appliance; and more specifically, although not exclusively, to determining a configuration of an open edge of the orthodontic appliance.

BACKGROUND

In orthodontics, treatments for achieving alignment of malposed teeth in a subject include applying orthodontic appliances, such as orthodontic aligners, to the subject's teeth. Orthodontic aligners are typically worn over teeth of an arch form in order to exert a force to the subject's teeth to cause movements thereof to their respective target positions, typically associated with their alignment within the arch form. In another example, the orthodontic aligners can be used to retain the subject's teeth in an already achieved desired position.

The orthodontic aligners are typically custom-made to the subject's teeth, and a shape of the orthodontic aligners, among other factors, defines the effective forces to be exerted to the teeth, and the effective correction that may be attained. Certain methods of designing such an aligner may comprise obtaining a 3D representation of the arch form, and based thereon, determining the required treatment plan for the teeth requiring alignment. The treatment plan may comprise multiple sequential treatment steps, each treatment step comprising a different aligner to be worn by the subject.

The aligners can be made by a thermoforming process, in which a preform is shaped using a mold to produce an unfinished aligner. The unfinished aligner is further processed, such as by trimming excess material along a predetermined cut line to form an open edge, the idea being that the cut line more closely follows the gum line of the subject for a more comfortable wear.

However, if the predetermined cut line does not follow the tooth-gingiva boundary accurately, the open edge may cause discomfort to the subject, such as rubbing and/or scratches of the gingiva. Also, as the teeth move during the orthodontic treatment, the configuration of the tooth-gingiva boundary and hence the open edge for each consecutive aligner in a set of aligners applied during the treatment may need to be re-determined, which may be computationally expensive.

Certain approaches for determining the cut line for forming the aligner have been proposed in the prior art.

United States Patent Application Publication No.: 2021/0271,225-A1 published on Sep. 2, 2021, assigned to Ormco Corp., and entitled "SYSTEMS AND METHODS FOR DESIGNING AND MANUFACTURING AN ORTHODONTIC APPLIANCE" discloses systems and methods of defining a trimline in relation to modeled teeth including modeled gingiva. The trimline is for use to manufacture an aligner. A margin point is placed proximate a gingival margin at each tooth on at least one jaw in the model. A trimline connects the plurality of margin points from which machine code is generated. The aligner manufactured includes an edge that correlates with the trimline according to the machine code. A margin point may be proximate a gingival zenith. At least one tooth cooperates with the modeled gingiva to define a line around the tooth. The trimline includes at least one tooth curve and at least one connector curve connected to the tooth curve at a transition point. At least one control point is on the trimline between two margin points. The trimline is defined by a spline that may be a Bezier curve.

U.S. Pat. No. 11,116,606-B1, issued on Sep. 14, 2021, assigned to Arkimos Ltd., and entitled "SYSTEMS AND METHODS FOR DETERMINING A JAW CURVE", discloses a method for determining a jaw curve for orthodontic treatment planning for a patient, the method being executable by a processor. The method includes obtaining a tooth and gingiva mesh from image data associated with teeth and surrounding gingiva of the patient, the mesh being representative of a surface of the teeth and the surrounding gingiva; obtaining a tooth contour of each tooth, the tooth contour being defined by a border between a visible portion of each tooth and the surrounding gingiva; determining a tooth contour center of each tooth, the tooth contour center of a given tooth being an average point of the tooth contour of the given tooth; projecting the tooth contour center of each tooth onto a jaw plane; and fitting the tooth contour center of each tooth to a curve to determine the jaw curve.

U.S. Pat. No. 10,842,594-B2, issued on Nov. 24, 2020, assigned to Clearcorrect Operating LLC, and entitled "VIRTUAL MODELING OF GINGIVA ADAPTATIONS TO PROGRESSIVE ORTHODONTIC CORRECTION AND ASSOCIATED METHODOLOGY OF APPLIANCE MANUFACTURE", discloses a system and associated methodology for the generation of digital models that account for the adaptation of the shape of the patient's gingiva. The exemplary system uses an initial scan of the patient's gingiva as a base model, taking into account the type and morphology of the teeth, the shape, orientation and movements of the roots inside the gingiva, and other factors for a more accurate prediction of the changes in the shape of the gingiva throughout every step of the treatment. In particular, the system proactively determines the areas of the model that will be covered by the aligner and prevents changes to such areas, whereas the shape of the model outside these areas is altered in a way to minimize the size of model and to add any necessary features for the manufacturing of the aligners.

United States Patent Application Publication No.: 2014/0295,373-A1, published on Oct. 2, 2014, assigned to Bern Universitaet, and entitled "DEVICE FOR TREATING GINGIVA/MUCOSA AT TEETH OR IMPLANTS", discloses a device for "treating" gingiva/mucosa at teeth/implants comprising at least one segment comprising a contour surface formed according to an individual geometry of a patient's dentition for closely contacting a region of an outer surface of a tooth and an adjacent region of a gingiva, whereas the regions in particular include a sulcus region, a storage and/or supply for a composition including a cleaning agent, a remineralizing composition, and/or a pharmaceutical composition to be applied to the regions of the tooth and the gingiva and a transmission element for transmitting vibrations to the at least one segment.

United States Patent Application Publication No.: 2021/0178,654-A1, published on Jun. 17, 2021, assigned to Align Technology Inc., and entitled "METHOD OF FORMING A ORTHODONTIC APPLIANCE", discloses a device for "treating" gingiva/mucosa at teeth/implants comprising at least one segment comprising a contour surface formed according to an individual geometry of a patient's dentition for closely contacting a region of an outer surface of a tooth and an adjacent region of a gingiva, whereas the regions in particular include a sulcus region, a storage and/or supply for a composition including a cleaning agent, a remineralizing composition, and/or a pharmaceutical composition to be applied to the regions of the tooth and the gingiva and a transmission element for transmitting vibrations to the at least one segment.

SUMMARY

It is an object of the present technology to ameliorate at least some of the inconveniences present in the prior art.

Developers of the present technology have appreciated that determining the cut line, which defines the open edge within the unfinished aligner, as extending along points of the gingiva having the least profile change (or otherwise, deformation) during the orthodontic treatment may increase the wear comfort of the aligner. This may further translate to an increased adherence of the subject to the orthodontic treatment, which may thus allow increasing the overall efficacy thereof.

Also, the developers have appreciated that re-determining the cut line at each consecutive stage of the orthodontic treatment can be avoided by determining, at a given stage of the treatment, specific coordinates of the points defining a respective configuration of the open edge of a given aligner along the gingiva relative to current positions of the teeth, and further using these coordinates for other aligners in the set of aligners applied during the orthodontic treatment. This may help reduce the computational burden on a processor and hence increase efficiency of determining and manufacturing processes of the aligners for a given subject.

More specifically, in accordance with a first broad aspect of the present technology, there is provided a method for determining a configuration of an open edge for an orthodontic appliance of a set of orthodontic appliances. The set of orthodontic appliances is configured to be applied to a subject during an orthodontic treatment. The method is executable by a processor of a computer system. The method comprises: receiving, by the processor, image data associated with the subject. The image data includes: a current 3D digital model representative of a current configuration of a surface of a subject's arch form including teeth and a gingiva; and data representative of segmentation contours between the teeth and the gingiva. The method further comprises: obtaining, by the processor, in the current 3D digital model, along a surface of the gingiva, an indication of a respective position for a given control point of a plurality of control points, the plurality of control points defining the open edge for the given orthodontic appliance of the set of orthodontic appliances, the respective position for the given control point being determined such that: the respective position corresponds to a position on the gingiva undergoing a predetermined change of a profile of the gingiva during the orthodontic treatment, and the respective position corresponds to a position on the gingiva which is within a predetermined distance from a given segmentation contour associated with a respective tooth; determining, by the processor, based on the obtained respective positions of each one of the plurality of control points within the current 3D digital model, a respective vector of positioning values for each one of the plurality of control points. The determining the respective vector of positioning values for the given control point of the plurality of control points comprises: identifying, along the given segmentation contour, at least one anchor point of a plurality of anchor points; identifying, by the processor, in the plurality of anchor points, a closest anchor point to the given control point; determining, by the processor, a distance from the given control point to the closest anchor point. The method further comprises storing, by the processor, the respective vector of positioning values for each one of the plurality of control points for further use in determining a respective configuration of the open edge for each other one of the set of orthodontic appliances.

In some implementations of the method, the determining the respective vector of positioning values for the given control points in the current 3D digital model further comprises: determining a ratio value indicative of a ratio between (1) a first distance value from the given control point to a first neighboring anchor point to the closest one; and (2) and a second distance value from the given control point to a second neighboring anchor point to the closest one.

In some implementations of the method, the ratio value is determined according to an equation:

$$\frac{d_1}{d_1 + d_2},$$

where $d_1$ is the first distance value, and
$d_2$ is the second distance value.

In some implementations of the method, the identifying the at least one anchor point comprises: determining, along the given segmentation contour, a lingual and buccal portions thereof; and identifying the at least one anchor point as being representative of a point of maximum curvature of each one of the lingual and the buccal portion of the given segmentation contour.

In some implementations of the method, determining the distance from the given control point to the closest anchor point is executed, by the processor, using a distance field determined, in the current 3D digital model, along the surface of the gingiva.

In some implementations of the method, the current 3D digital model comprises a plurality of vertices representative of the current configuration of the surface of the subject's arch form, and the method further comprises determining the distance field along the surface of the gingiva in the current 3D digital model, by: determining, by the processor, for a given gingiva vertex representative of the surface of the gingiva, a respective gingiva shortest distance value therefrom, along the surface of the gingiva, to each one of the segmentation contours; assigning, by the processor, a positive sign to the respective gingiva shortest distance value; determining, by the processor, for a given tooth vertex representative of a surface of a given tooth of the subject, a respective tooth shortest distance value therefrom, along the surface of the given tooth, to a respective segmentation contour associated with the given tooth; and assigning, by the processor, a negative sign to the respective tooth shortest distance.

In some implementations of the method, determining any one of the respective gingiva shortest distance value and the respective tooth shortest distance comprises applying a Dijkstra's algorithm.

In some implementations of the method, the obtaining the data representative of the segmentation contours between the teeth and the gingiva comprises determining the segmentation contours based on the current 3D digital model, determining of a given segmentation contour, associated with a respective tooth of the teeth, being based on analyzing, in the current 3D digital model, curvature of at least one of the respective tooth and a portion of the gingiva therearound.

In some implementations of the method, the position on the gingiva undergoing the predetermined change of the profile of the gingiva during the orthodontic treatment is determined based on gingiva deformation values of gingivae of other subjects having received the orthodontic treatment.

In some implementations of the method, the position on the gingiva undergoing the predetermined change of the profile of the gingiva during the orthodontic treatment is obtained from an orthodontic practitioner.

In some implementations of the method, the predetermined change of the profile of the gingiva comprises a minimum change thereof during the orthodontic treatment.

In some implementations of the method, the method further comprises: obtaining, by the processor, an other 3D digital model representative of an other configuration of the subject's arch form during the orthodontic treatment and for which an other orthodontic appliance of the set of orthodontic appliances, different from the given orthodontic appliance, will be used; determining, in the other 3D digital model, new positions of the plurality of anchor points; applying, by the processor, based on the new positions of the plurality of anchor points, each one of the plurality of control points to the other 3D digital model according to the respective vector of positioning values; determining, by the processor, in the other 3D digital model, a respective configuration of the open edge for the other orthodontic appliance as a line extending through the plurality of control points; and using the other 3D digital model with the respective configuration of the open edge determined thereon for manufacturing the other orthodontic appliance.

In some implementations of the method, the determining the respective configuration of the open edge comprises sequentially joining, in the other 3D digital model, the plurality of control points applying a Dijkstra's algorithm.

In some implementations of the method, the determining the respective configuration of the open edge comprises sequentially joining, in the other 3D digital model, the plurality of control points comprises applying a spline function.

In some implementations of the method, the using the other 3D digital model comprises: generating, by the processor, based on the other 3D digital model with the respective configuration of the open edge determined thereon, an orthodontic appliance 3D digital model of the other orthodontic appliance; and causing, by the processor, 3D-printing of the other orthodontic appliance according to the orthodontic appliance 3D digital model.

In some implementations of the method, the using the other 3D digital model comprises causing, by the processor, based on the other 3D digital model, manufacture of an orthodontic appliance mold for the other orthodontic appliance; causing, by the processor, thermoforming of an unfinished orthodontic appliance onto the orthodontic appliance mold; causing, by the processor, application of the line extending through the plurality of control points and defining the respective configuration of the open edge to the unfinished orthodontic appliance; and causing, by the processor, cutting the unfinished orthodontic appliance along the line, thereby manufacturing the other orthodontic appliance.

In some implementations of the method, the method further comprises causing display of the other 3D digital model with the respective configuration of the open edge for the other orthodontic appliance determined thereon.

In some implementations of the method, the given orthodontic appliance of the set of orthodontic appliances is an orthodontic aligner.

In accordance with a second broad aspect of the present technology, there is provided a computer system for determining a configuration of an open edge for an orthodontic appliance of a set of orthodontic appliances. The set of orthodontic appliances is configured to be applied to a subject during an orthodontic treatment. The computer system includes: a processor and a non-transitory computer-readable medium storing instructions. The processor, upon executing the instructions, is configured to: receive image data associated with the subject, the image data including: a current 3D digital model representative of a current configuration of a surface of a subject's arch form including teeth and a gingiva; and data representative of segmentation contours between the teeth and the gingiva; obtain in the current 3D digital model, along a surface of the gingiva, an indication of a respective position for a given control point of a plurality of control points, the plurality of control points defining the open edge for the given orthodontic appliance of the set of orthodontic appliances, the respective position for the given control point being determined such that: the respective position corresponds to a position on the gingiva undergoing a predetermined change of a profile of the gingiva during the orthodontic treatment, and the respective position corresponds to a position on the gingiva which is within a predetermined distance from a given segmentation contour associated with a respective tooth; determine, based on the obtained respective positions of each one of the plurality of control points within the current 3D digital model, a respective vector of positioning values for each one of the plurality of control points, determining the respective vector of positioning values for the given control point of the plurality of control points comprising: identifying, along the given segmentation contour, at least one anchor point of a plurality of anchor points; identifying, by the processor, in the plurality of anchor points, a closest anchor point to the given control point; determining, by the processor, a distance from the given control point to the closest anchor point; and store the respective vector of positioning values for each one of the plurality of control points for further use in determining a respective configuration of the open edge for each other one of the set of orthodontic appliances.

In some implementations of the computer system, to determine the respective vector of positioning values for the given control points in the current 3D digital model, the processor is further configured to: determine a ratio value indicative of a ratio between (1) a first distance value from the given control point to a first neighboring anchor point to the closest one; and (2) and a second distance value from the given control point to a second neighboring anchor point to the closest one.

In the context of the present specification, the term "orthodontic treatment" is broadly referred to as any type of medical intervention aimed at correcting malocclusions associated with the subject's teeth, including surgical and non-surgical manipulations, such as, but not limited to, using aligners. Further, the orthodontic treatment, as referred to herein, may be determined by a professional practitioner in the field of dentistry (such as an orthodontist, a maxillofacial surgeon, for example), or automatically by a specific software, based on respective image data and input parameters associated with the subject.

Further, in the context of the present specification, the term "cut line" is a representation of an edge of an aligner, at an open end thereof, or a line along which the edge of the aligner will be formed once an unfinished aligner is cut along the cut line.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale.

DETAILED DESCRIPTION

Certain aspects and embodiments of the present technology are directed to methods of and systems for determining a configuration of an open edge for a set of aligners used in the course of an orthodontic treatment, and further manufacturing each one of the set of aligners based on the so determined configuration of the open edge.

More specifically, certain aspects and embodiments of the present technology comprise a computer-implemented method of (i) determining, based on a given configuration of a subject's arch form, along a gingiva, points defining the open edge of a respective aligner such that the gingiva at these points has the least profile change during the orthodontic treatment; and (ii) determining specific coordinates of such points; and (iii) using these coordinates to determine positions of the points defining the open edge for further aligners of the set of the aligners applied to the subject during the orthodontic treatment.

Certain embodiments of the present technology minimize, reduce, or avoid some of the problems noted with the prior art. For example, by implementing certain embodiments of the current technology in respect of determining the cut line, one or more of the following advantages may be obtained: (1) a shape of the aligner having an improved wear comfort due to preventing rubbing of the gingiva against the open edge of the aligner, which may further allow for an increased adherence of the subject to the orthodontic treatment and hence effectiveness thereof; and (2) a greater efficiency of manufacturing the aligners due to using the specific coordinates for determining the open edge of each consecutive aligner in the set, which can help avoid the need for re-determining the open edge at each further stage of the orthodontic treatment, thereby saving computational resources of a processor.

Orthodontic Treatment

Figure 1:
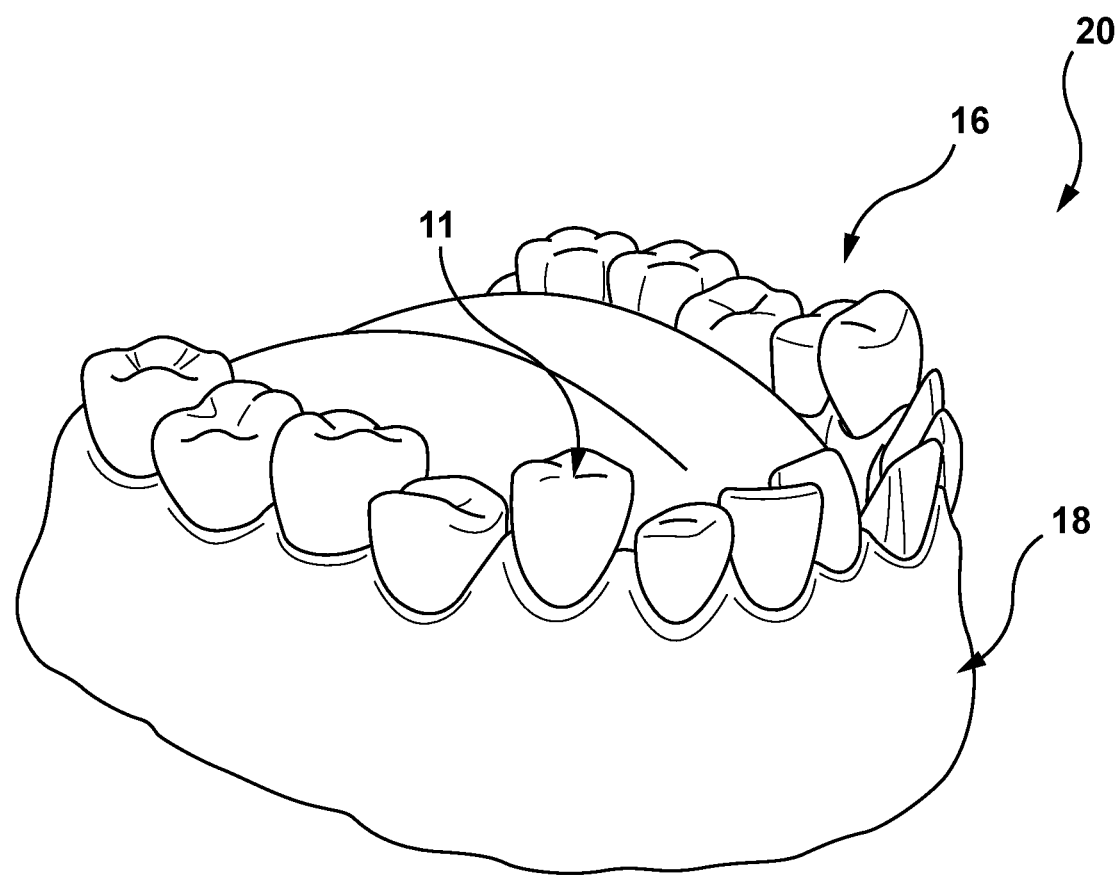
FIG. 1 depicts a perspective view of a lower arch form of a subject exemplifying a misalignment of some of subject's teeth, in accordance with certain non-limiting embodiments of the present technology.

With initial reference to FIG. 1, there is depicted a perspective view of a lower arch form 20 of the subject, to which certain aspects and non-limiting embodiments of the present technology may be applied.

As can be appreciated, the lower arch form 20 includes lower teeth 16 and lower gingiva 18. Further, in the depicted embodiments of FIG. 1, a given tooth 11 is misaligned within the lower arch form 20. More specifically, the given tooth 11 abnormally protrudes upwardly and is shifted lingually.

Thus, for resolving the present orthodontic disorders of the lower teeth 16, an orthodontic treatment may be provided to the subject.

In accordance with certain non-limiting embodiments of the present technology, the orthodontic treatment may comprise applying an orthodontic appliance. Generally speaking, the orthodontic appliance may be configured to exert a respective predetermined force onto the given tooth 11 causing it to move towards a desired position, which may be associated with an alignment of the given tooth 11 within the lower teeth 16. More specifically, in the depicted embodiments of FIG. 1, the orthodontic appliance may be configured to cause the given tooth 11 to move outwardly, that is, labially, between its neighboring teeth; and further cause intrusion of the given tooth 11 in tissues of the lower gingiva 18. In various non-limiting embodiments of the present technology, the orthodontic appliance may comprise orthodontic appliances of different types, shapes, sizes and configurations, such as those including, without limitation, splints, brackets, multi-strand wires, strips, retainers, and plates.

Figure 2A:
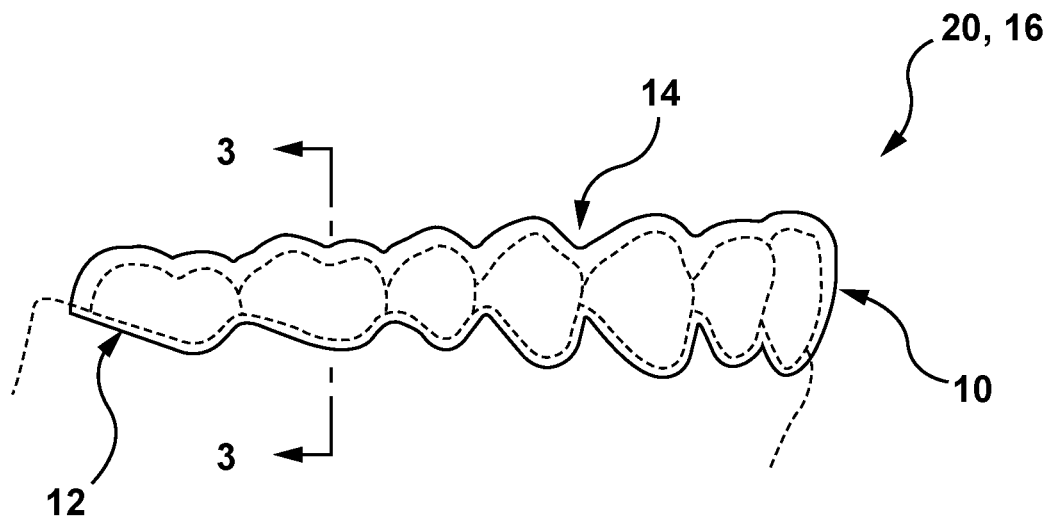
FIGS. 2A and 2B depict a side view and a cross-sectional view through line 3-3, respectively, of a given configuration of an orthodontic appliance applied to the subject's teeth that may be configured to treat the malocclusions of the subject's teeth present in FIG. 1, in accordance with certain non-limiting embodiments of the present technology.
Figure 2B:
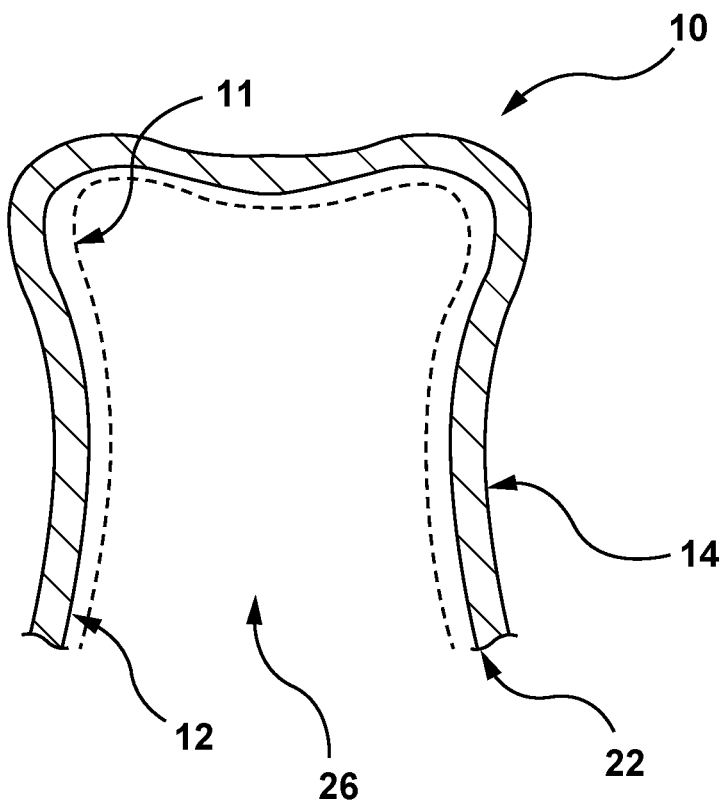

In specific non-limiting embodiments of the present the present technology, the orthodontic appliance may include an orthodontic aligner. With reference to FIGS. 2A and 2B, there is depicted an aligner 10 applied to at least some of the lower teeth 16, in accordance with certain non-limiting embodiments of the present technology. The aligner 10 comprises an inner surface 12 and an outer surface 14. The inner surface 12 defines a channel 26, which is configured, in some non-limiting embodiments of the present technology, for receiving crown portions of the at least some of the lower teeth 16 including the given tooth 11. However, in other non-limiting embodiments of the present technology, the channel 26 of the aligner 10 may be configured to receive crown portions of all of the lower teeth 16. At least one edge, such as an open edge 22 of the channel 26, extending along labial and lingual surfaces of the lower teeth 16, can be shaped for following the lower gingiva 18.

It is appreciated that, in accordance with certain non-limiting embodiments of the present technology, the aligner 10 may be used for treating different types of teeth misalignment or malocclusion, including but not limited to one or more of: closing interdental spaces ("space closure"), creating/widening interdental spaces, tooth rotation, tooth intrusion/extrusion, and tooth translation, to name a few. It should further be noted that in certain non-limiting embodiments of the present technology, applying the aligner 10 to the lower teeth 16 may further include applying specific attachments (also known as "fixing blocks") thereto.

The aligner 10 is designed in such a way that its inner surface 12 is configured to impose certain forces on one or more of the lower teeth 16 to obtain a desired position of the lower teeth 16 at a given stage of the orthodontic treatment.

Needles to say that, although in the depicted embodiments of FIGS. 2A and 2B, the aligner 10 is configured to be applied onto the lower teeth 16, in other non-limiting embodiments of the present technology, a respective configuration of the aligner 10 may be applied to the upper teeth (not depicted) of the subject for conducting the orthodontic treatment of respective malocclusion disorders.

According to certain non-limiting embodiments of the present technology, the aligner 10 may be made of a polymer, such as a thermoplastic material. In other non-limiting embodiments of the present technology, the aligner 10 may be made of poly-vinyl chloride (PVC). In yet other non-limiting embodiments of the present technology, the aligner 10 may be made of polyethylene terephthalate glycol (PETG). Other suitable materials can also be used to form the aligner 10.

In some non-limiting embodiments of the present technology, the aligner 10 may be manufactured using additive manufacturing techniques, such as 3D printing techniques where the aligner 10, including the desired configuration of the open edge 22 is formed through printing according to a pre-generated 3D representation thereof.

However, in other non-limiting embodiments of the present technology, the aligner 10 may be produced by a thermoforming process where (1) an unfinished aligner is produced, using a preform, on a respective aligner mold (not depicted) associated with a respective stage of the orthodontic treatment, which is configured to shape the inner surface 12 of the aligner 10; and (2) the unfinished aligner is cut along a predetermined cut line, defining the open edge 22 of the channel 26 of the aligner 10, to remove excess material therefrom, thereby producing the aligner 10.

Figure 3:
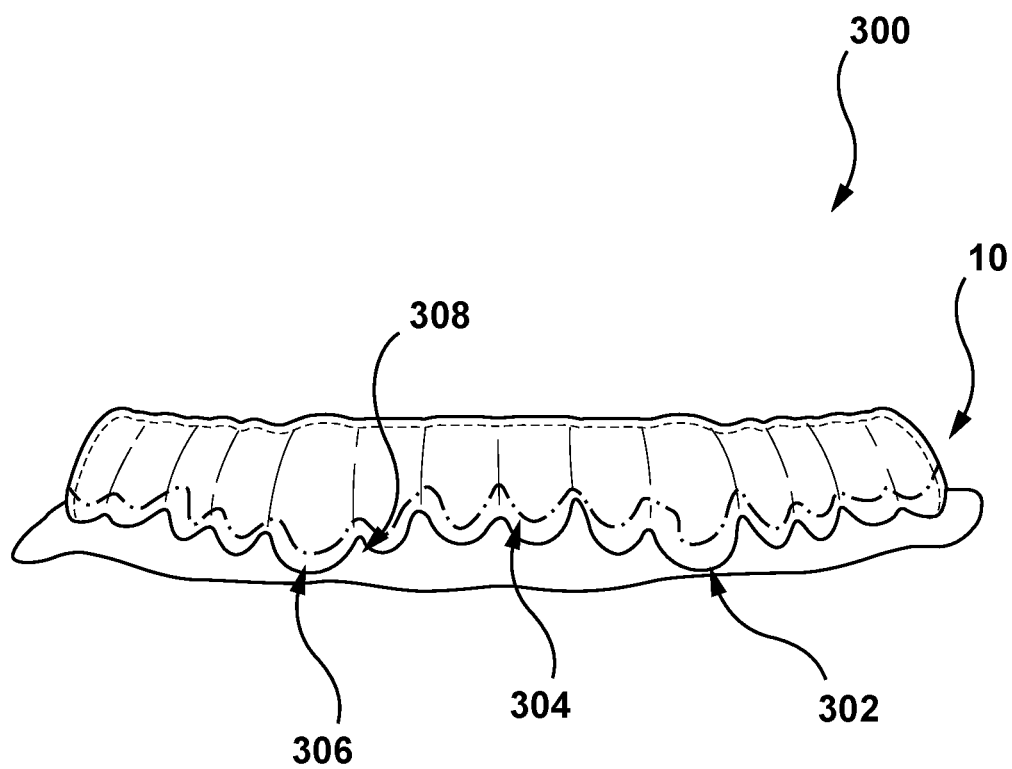
FIG. 3 depicts a panoramic view of an unfinished orthodontic appliance with a cut line applied thereon used for manufacturing the given configuration of the orthodontic appliance present in FIGS. 2A and 2B, in accordance with certain non-limiting embodiments of the present technology.

With reference to FIG. 3, there is depicted an example configuration of an unfinished aligner 300 used for producing the aligner 10, in accordance with certain non-limiting embodiments of the present technology.

As it can be appreciated from FIG. 3, the unfinished aligner 300 includes an excess portion 302 formed as an artefact after the thermoforming, which thus needs to be removed in order to produce the aligner 10, the aligner 10 comprising an upper portion (in the orientation of FIG. 3) of the unfinished aligner 300. For example, according to certain non-limiting embodiments of the present technology, the unfinished aligner 300 may be trimmed by a cutting device along a cut line 304.

However, in order to form the aligner 10 of a desired shape, that is, corresponding to a respective stage of the orthodontic treatment, the cut line 304 should be accurately determined to consider the actual spatial curvature of crown portions (not separately labelled) of the lower teeth 16 and the wear comfort of the aligner 10 so produced.

As best seen in FIG. 3, prior art approaches to determining the cut line 304 can include determining the cut line 304 extending over a tooth-gingiva boundary 306 between the lower gingiva 18 and crown portions of the lower teeth 16. However, the cut line 304 so determined can extend through gingival sulci of the lower gingiva 18, such as a given gingival sulcus 308, of interdental space between the lower teeth 16. As it can be appreciated, as the given gingival sulcus is one of most mobile, deformable, portions of the lower gingiva 18 during the movement of the lower teeth 16 in the course of the orthodontic treatment, the resulting configuration of the open edge 22 defined by the configuration of the cut line 304 of FIG. 3 may cause additional discomfort to the subject, such as rubbing or scratching within the given gingival sulcus 308.

Also, as the orthodontic treatment for aligning the lower teeth 16 can typically include applying a plurality of different configurations of the aligner 10, each of which is to be applied during a respective stage of the orthodontic treatment, a process for determining an individual configuration of the open edge 22 for each respective configuration of the aligner 10 can be a resource-intensive task for a processor (such as a processor 550 of a computer environment 500 described below).

Thus, developers of the present technology have appreciated that if each configuration of the open edge 22 is determined as extending along points of the lower gingiva 18 having least mobility (or least deformed) during the tooth movements, the plurality of configurations of the aligner 10 may cause less discomfort to the subject during the orthodontic treatment. For example, as it will be described in greater detail below, such points can be determined based on modelling tooth movements of the lower teeth 16 in the course of the orthodontic treatment.

Also, the developers have devised methods for determining specific positioning values (also referred to herein as "coordinates") of these points along the lower gingiva 18. These coordinates, once determined for a given configuration of the aligner 10, can allow restoring the positions of the points defining the open edge 22 along configurations of the lower gingiva 18 used for determining other configurations of the aligner 10, without repetitive modelling of the tooth movements at each stage of the orthodontic treatment.

Thus, the present methods and systems can allow (i) increasing the effectiveness of the orthodontic treatment, due to the elevated wear comfort of the aligner 10 resulting from determining the open edge 22 as extending along the points of the lower gingiva 18 having the least mobility during the orthodontic treatment; and (ii) increasing efficiency of manufacturing process of the configurations of the aligner 10, applied during the orthodontic treatment, due to using the respective positioning values without having to consider current deformation of each further configuration of the lower gingiva 18, used for determining a respective further configuration of the aligner 10.

How the points defining the open edge 22 and their coordinates along the lower gingiva 18 are determined, in accordance with certain non-limiting embodiments of the present technology, will be described below with reference to FIGS. 6 to 11.

System

Figure 4:
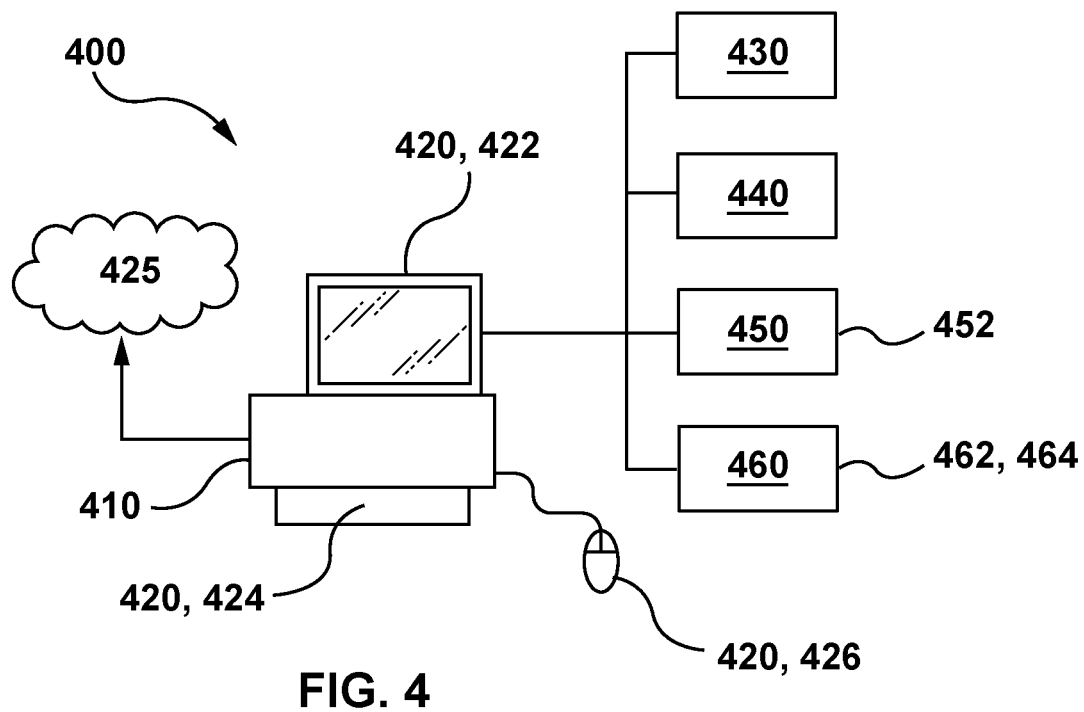
FIG. 4 depicts a schematic diagram of a system for determining the open edge of a plurality of configurations of the orthodontic appliance of FIGS. 2A and 2B, in accordance with certain embodiments of the present technology.
Figure 5:
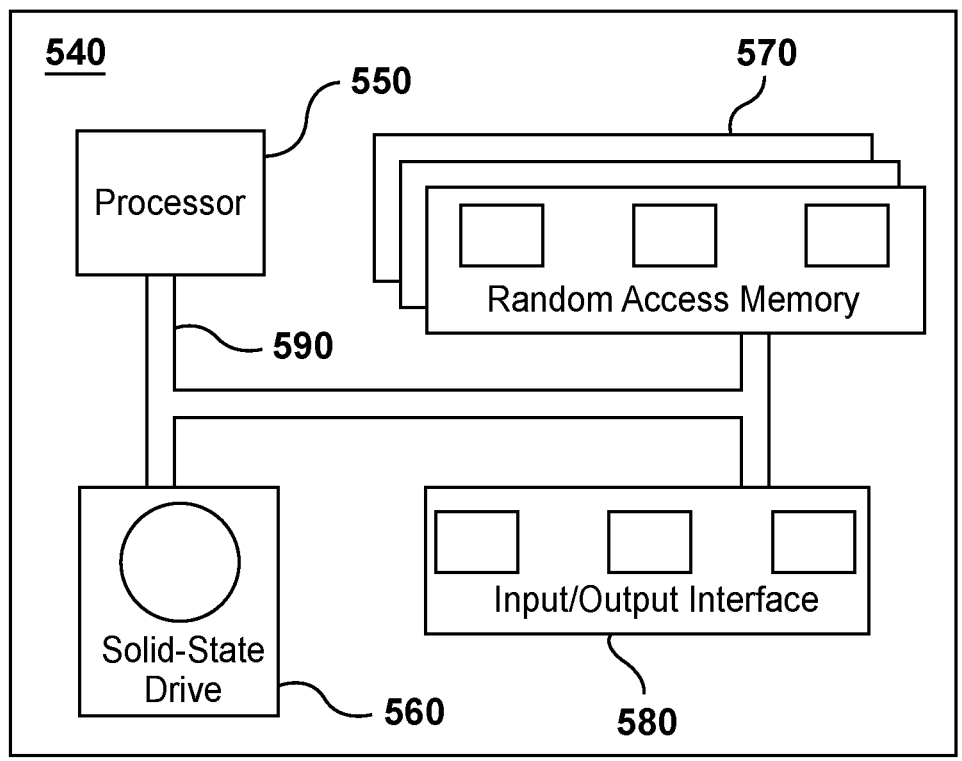
FIG. 5 depicts a schematic diagram of a computing environment of the system of FIG. 4, in accordance with certain embodiments of the present technology.

With reference to FIGS. 4 and 5, there is depicted a schematic diagram of a system 400 suitable for determining a configuration of an orthodontic appliance, such as the open edge 22 for the plurality of configurations of the aligner 10 as described above, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to determine, based on image data associated with the subject, such as a 3D digital model of the lower arch form 20, a shape of the open edge 22 for the given configuration of the aligner 10. In additional non-limiting embodiments of the present technology, the computer system 410 may further be configured to produce the given configuration of the aligner 10, based on the so determined shape of the open edge 22.

To that end, in some non-limiting embodiments of the present technology, the computer system 410 may be configured to receive image data pertaining to the subject or to a given stage of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of the given gingival sulcus 308, and dimensions of an external portion of the given tooth 11 of the lower teeth 16, such as a crown portion (not separately labelled) thereof extending outwardly of the gingival sulcus 308. In some embodiments, the image data is indicative of properties of internal portions of the anatomical structures, for example, volumetric properties of bone surrounding an internal portion of the given tooth 11 extending inwardly of the given gingival sulcus 308, such as a root portion (not separately depicted) of the given tooth 11. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In alternative non-limiting embodiments of the present technology, the computer system 410 may be configured to receive the image data associated with the subject directly from an imaging device 430 communicatively coupled thereto. Broadly speaking, the processor 550 may be configured to cause the imaging device 430 to capture and/or process the image data of the lower teeth 16 and the periodontium (not depicted) of the subject. In certain non-limiting embodiments of the present technology, the image data may include, for example, one or more of: (1) images of external surfaces of respective crown portions of the lower teeth 16, (2) images of an external surface of the periodontium including that of the lower gingiva 18, for example, and images of superficial blood vessels and nerve pathways associated with the lower teeth 16; and (3) images of an oral region. By doing so, the imaging device 430 may be configured, for example, to capture image data of the lower arch form 20 of the subject. In another example, the imaging device may also be configured to capture and/or process image data of an upper arch form (not depicted) associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device 430 may comprise an intra-oral scanner enabling to capture direct optical impressions of the lower arch form 20 the subject.

In a specific non-limiting example, the intraoral scanner can be of one of the types available from MEDIT, CORP. of 23 Goryeodae-ro 22-gil, Seongbuk-gu, Seoul, South Korea. It should be expressly understood that the intraoral scanner can be implemented in any other suitable equipment.

In yet other non-limiting embodiments of the present technology, the imaging device 430 can comprise a 3D laser scanner enabling to obtain a respective point cloud 3D digital model of the lower arch form 20—such as by scanning the lower arch form 20 directly or a mold thereof and thus registering three-dimensional coordinates of points representative of the surface of the lower arch form 20.

In a specific non-limiting example, the 3D laser scanner can be of one of the types available from LASER DESIGN LTD. of 5900 Golden Hills Drive, Minneapolis, Minn. 55416. It should be expressly understood that the desktop scanner can be implemented in any other suitable equipment.

Further, it is contemplated that the computer system 410 may be configured for processing of the received image data. The resulting image data of the lower arch form 20 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 410 may further comprise a corresponding computing environment.

Further, in some non-limiting embodiments of the present technology, the system 400 may be configured, based on the 3D digital model of the lower arch form 20, for example, determine the orthodontic treatment for the subject including (i) determining tooth trajectories for the at least some of the lower teeth 16, such as the given tooth 11, defining their paths from their initial to target positions; and (ii) respective forces to be applied to the at least some of the lower teeth 16 causing them to move along the so determined tooth trajectories.

For example, in some non-limiting embodiments of the present technology, the processor 550 can be configured to determine the tooth trajectories and the respective forces causing the lower teeth 16 to move along the tooth trajectories as described in a co-owned U.S. Pat. No. 10,993,782-B1 issued on May 4, 2021, and entitled "SYSTEMS AND METHODS FOR DETERMINING A TOOTH TRAJECTORY", a content of which is incorporated herein by reference in its entirety.

Further, in certain non-limiting embodiments of the present technology, the system 400 may be configured to produce at least one configuration of the aligner 10, configured to cause the at least some of the lower teeth 16 to move along the so determined tooth trajectories based on the planned orthodontic treatment.

To that end, the system 400 can further include a manufacturing system 440, to which the processor 550 can be configured to send respective instructions causing the manufacturing system 440 to produce the at least one configuration of the aligner 10. In some non-limiting embodiments of the present technology, the manufacturing system 440 can be a thermoforming system configured to produce the unfinished aligner 300, for example, using a thermopriming process, in which a preform aligner (not depicted) is shaped on the mold of the lower arch form 20.

In a specific non-limiting example, the thermoforming system can be of one of the types provided by HAMER LTD. of Rambla Antoni Gaudí, 108792 La Granada (Barcelona) Spain. It should be expressly understood that the thermoforming system can be implemented in any other suitable equipment.

Further, after the thermoforming the unfinished aligner 300, the system 400 can be configured to trim excess material thereof, that is the excess portion 302, as described above, along the cut line 304 to produce the open edge 22 of the at least one configuration of the aligner 10.

To that end, in some non-limiting embodiments of the present technology, the system 400 can be configured to determine (or otherwise receive) data indicative of the cut line 304 304 and mark the cut line 304 on the unfinished aligner 300. To that end, the system 400 may further comprise a marking subsystem 450. It is not limited how the marking subsystem 450 may be implemented; however, in various non-limiting embodiments of the present technology, the marking subsystem 450 may include a marking head 452 for applying the cut line 304 onto the unfinished aligner 300 and a first robotic arm (not depicted) for holding and manipulating the unfinished aligner 300 around the marking head 452. In some non-limiting embodiments of the present technology, the marking head 452 may further comprise a coloring material storage (not depicted) for storing a coloring material (such as ink, as an example) and a supply control block (not depicted). In some non-limiting embodiments of the present technology, the marking head 452 may be implemented as a laser apparatus configurable to scorch the cut line 304 on the unfinished aligner 300.

In certain non-limiting embodiments of the present technology, the system 400 may further be configured to detect the cut line 304 applied on the unfinished aligner 300 and cut along the cut line 304 to produce the aligner 10. In this regard, the system 400 may further comprise a forming subsystem 460. In some non-limiting embodiments of the present technology, the forming subsystem 460 may include a second robotic arm (not depicted), at an end-effector of which there is installed a camera device 462. In some non-limiting embodiments of the present technology, the camera device 462 can be any appropriate digital camera configured to detect the cut line 304 applied by the marking subsystem 450 described above onto the unfinished aligner 300, including, for example, but not limited to, a coupled-charged device camera (a CCD camera). Further, as mentioned above, the forming subsystem 460 may include the cutting device 464. Non limiting examples of the cutting device 464 may include a laser-based cutting device, a mechanical cutting device such as using a blade with a rotary or linear cutting action, and a waterjet-based cutting device, as an example.

In some non-limiting embodiments of the present technology, both the marking subsystem 450 and the forming subsystem 460 of the system 400 may be implemented as described in a co-owned U.S. patent application Ser. No. 16/704,718 filed on Dec. 5, 2019, entitled "SYSTEMS AND METHODS FOR FORMING PERSONALIZED ORTHODONTIC APPLIANCES", the content of which is hereby incorporated by reference in its entirety.

Thus, the forming subsystem 460 may be configured to: (1) cause the camera device 462 to move around the unfinished aligner 300 with the cut line 304 applied thereon to detect the cut line 304 and generating respective image data thereof; (2) receive the image data of the cut line 304; and (3) based on the received image data of the cut line 304, cause cutting, by the cutting device 464 the unfinished aligner 300 along the cut line 304, thereby forming the aligner 10.

In other non-limiting embodiments of the present technology, the forming subsystem 460 may be configured for cutting the unfinished aligner 300 without requiring detection of the cut line 304. Instead, the determined cut line 304 is used to guide the cutting—for example, based on received data indicative of a position of the cut line 304 within the unfinished aligner 300. In some non-limiting embodiments of the present technology, the data indicative of the position of the cut line 304 within the unfinished aligner 300 may include at least one of: Cartesian coordinates; angular data indicative of a cutting angle for cutting the unfinished aligner 300; and a distance from the cutting device 464, as an example.

However, in other non-limiting embodiments of the present technology, the manufacturing system 440 can comprise an additive manufacturing system, such as a 3D printer, configured for direct manufacturing (printing) the at least one configuration of the aligner 10.

In a specific non-limiting example, the 3D printer can be of one of the types of HP Jet Fusion available from HP INC. of 1501 Page Mill Road, Palo Alto, Calif., 94304, United States of America. It should be expressly understood that the 3D printer can be implemented in any other suitable equipment.

Further, with reference to FIG. 5, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random-access memory 570 and an input/output interface 580. Communication between the various components of the computing environment 540 may be enabled by one or more internal and/or external buses 590 (for example, a PCI bus, universal serial bus, IEEE 1394 "Firewire" bus, SCSI bus, Serial-ATA bus, ARINC bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller, and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring™. The specific physical layer and the data link layer may provide a base for a full network protocol stack, allowing communication among small groups of computers on the same local area network (LAN) and large-scale network communications through routable protocols, such as IP.

According to implementations of the present technology, the solid-state drive 560 stores program instructions suitable for being loaded into the random-access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (that is, an "off the shelf" generic computer system). The generic computer system may be a desktop computer/personal computer but may also be any other type of electronic device such as, but not limited to, a laptop, a mobile device, a smart phone, a tablet device, or a server.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the interface device 420 being in communication with the input/output interface 580. In the embodiment of FIG. 4, the interface device is a screen 422. In other non-limiting embodiments of the present technology, the interface device 420 may be a monitor, a speaker, a printer, or any other device for providing an output in any form such as an image form, a written form, a printed form, a verbal form, a 3D model form, or the like.

In the depicted embodiments of FIG. 4, the interface device 420 also comprises a keyboard 424 and a mouse 426 for receiving input from the user of the system 400. Other interface devices 420 for providing an input to the computer system 410 can include, without limitation, a USB port, a microphone, a camera, or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Figure 6:
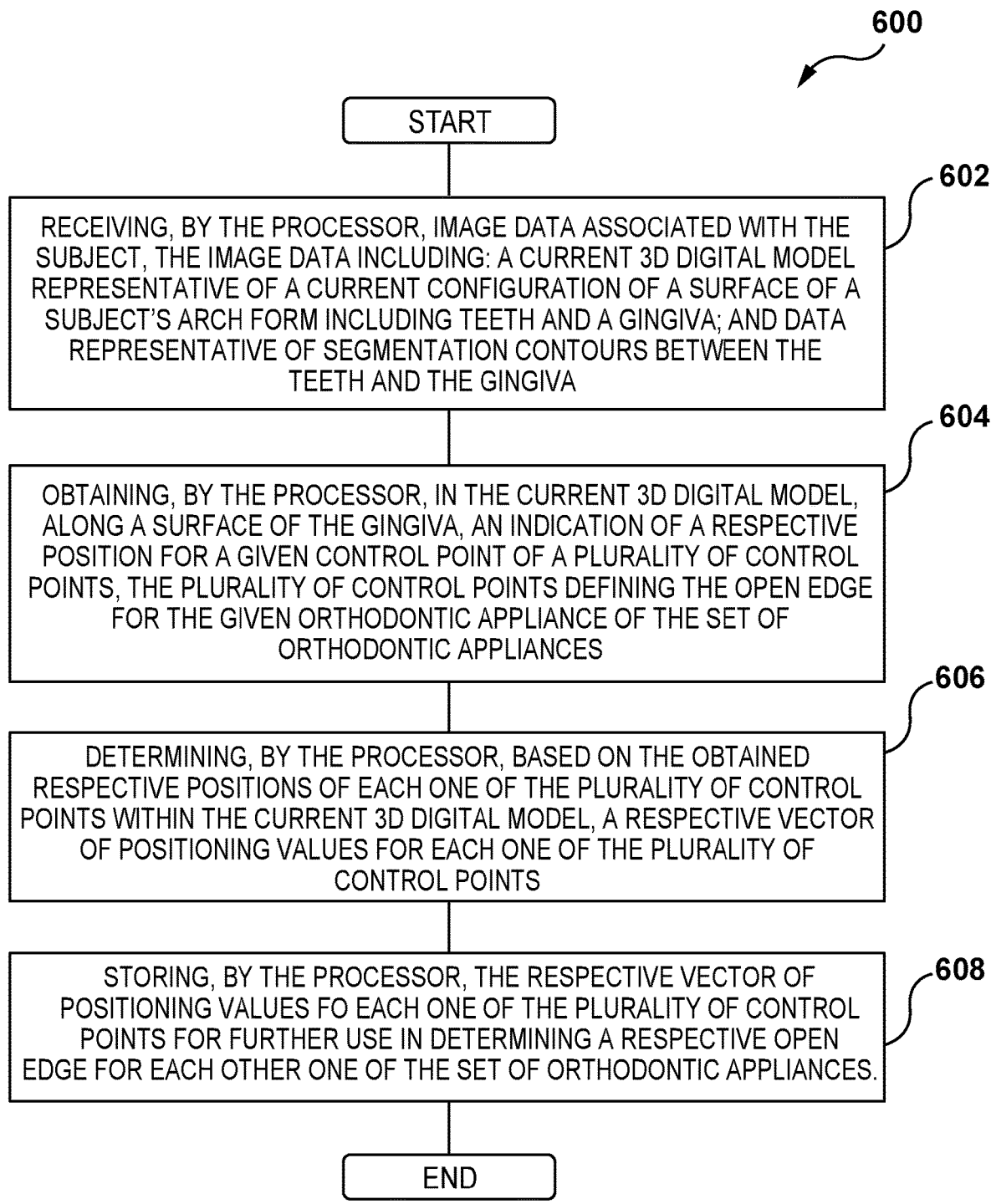
FIG. 6 depicts a flowchart diagram of a method of determining the open edge of the plurality of configurations of the orthodontic appliance of FIGS. 2A and 2B, in accordance with certain non-limiting embodiments of the present technology.

Thus, given the architecture and examples provided above, it is now possible to execute a method of determining the open edge 22 for a plurality of configurations of the aligner 10 used at different stages of the orthodontic treatment, as described above. With reference to FIG. 6, there is depicted a schematic diagram of a method 600, in accordance with certain non-limiting embodiments of the present technology. For example, the method 600 can be executed by the processor 550 of the system 400.

Method

STEP 602: RECEIVING, BY THE PROCESSOR, IMAGE DATA ASSOCIATED WITH THE SUBJECT, THE IMAGE DATA INCLUDING: A CURRENT 3D DIGITAL MODEL REPRESENTATIVE OF A CURRENT CONFIGURATION OF A SURFACE OF A SUBJECT'S ARCH FORM INCLUDING TEETH AND A GINGIVA; AND DATA REPRESENTATIVE OF SEGMENTATION CONTOURS BETWEEN THE TEETH AND THE GINGIVA

The method 600 commences at step 602 with the processor 550 being configured to obtain the image data associated with the subject. More specifically, according to certain non-limiting embodiments of the present technology, the processor 550 can be configured to receive a 3D digital models of the subject's arch form.

Figure 7:
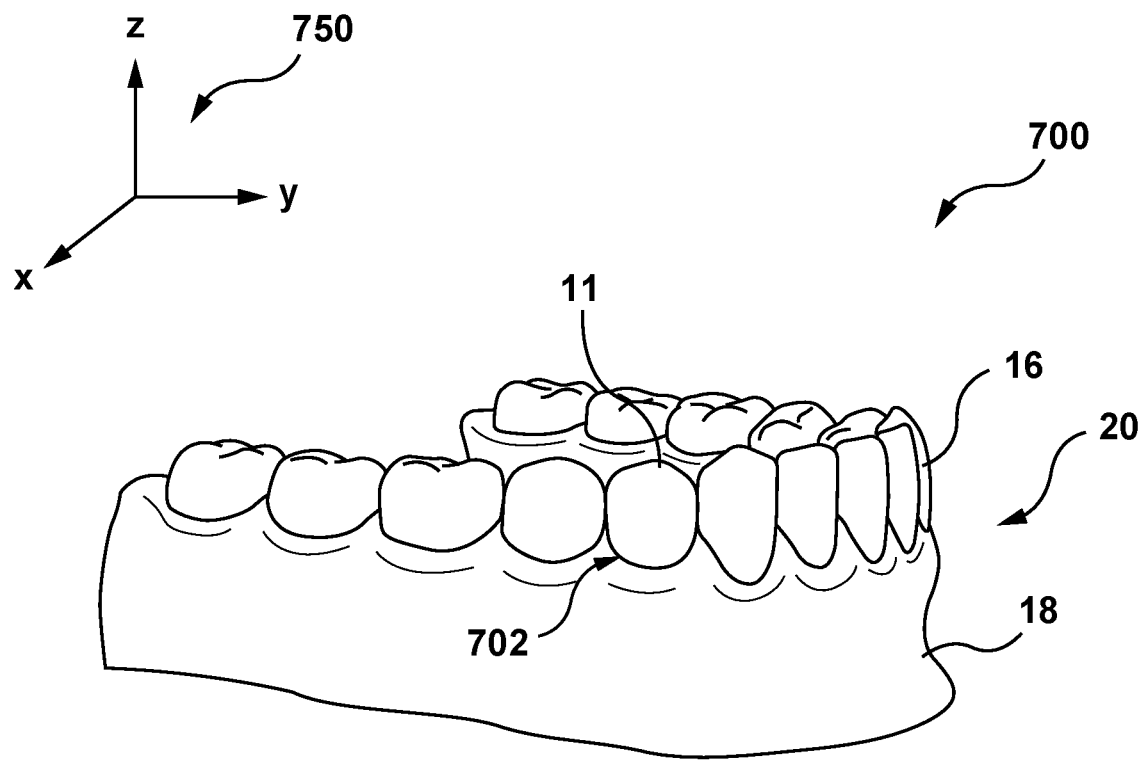
FIG. 7 depicts a perspective view of a 3D digital model of a mold of the given configuration of the orthodontic appliance present in FIGS. 2A and 2B, in accordance with certain non-limiting embodiments of the present technology.

With reference to FIG. 7, there is schematically depicted a perspective view of a 3D digital model 700 representing the lower arch form 20 of the subject, which can be used, by the processor 550 for determining the open edge 22 of the at least one of the plurality of configurations of the aligner 10 used during the orthodontic treatment, in accordance with certain non-limiting embodiments of the present technology.

As noted above, according to the non-limiting embodiments of the present technology, the lower arch form 20 comprises lower teeth 16 (also referred to herein as "mandibular teeth") and a lower gingiva 18. As it can be appreciated, each one of the lower teeth 16 are represented, in the 3D model 700, by respective crown portions thereof. However, in other non-limiting embodiments of the present technology, the lower teeth 16 can further be represented by their root portions (not depicted) in the 3D digital model 700.

In some non-limiting embodiments of the present technology, as mentioned hereinabove, the 3D digital model 700 can be representative of an aligner mold of the given configuration of the aligner 10 used at a respective stage of the orthodontic treatment. However, embodiments where the 3D digital model 700 is used for determining the aligner 3D digital model of the given configuration of the aligner 10 without producing the aligner mold are also envisioned.

In other words, the 3D digital model 700 can be representative of a desired configuration of the lower arch form 20, including target positions of each one of the lower teeth 16 for the respective stage of the orthodontic treatment, to which they are to be caused to move by the given configuration of the aligner 10.

Also, as it can be appreciated, in some non-limiting embodiments of the present technology, the 3D digital model 700 can further include a portion representative of the upper arch form (not depicted) including upper teeth (also referred to herein as "maxillary teeth") and an upper gingiva (not depicted), which can further be used for determining a respective configuration of the aligner 10 to be applied to the upper teeth of the subject, as will be described below based on the example for the given configuration of the aligner 10 for the lower teeth 16.

In some non-limiting embodiments of the present technology, the processor 550 can be configured to receive, from the imaging device 430 communicatively coupled with the processor 550, the 3D digital model 700 comprising a plurality of mesh elements (not depicted) representative of a surface of the lower arch form 20. For example, the imaging device 430 can be configured to generate the plurality of mesh elements including, without limitation, triangular mesh elements, quadrilateral mesh elements, convex polygonal mesh elements, or even concave polygonal mesh elements, as an example, without departing from the scope of the present technology.

However, in those embodiments where the imaging device 430 is the 3D laser scanner, the 3D digital model 700 comprises a 3D point cloud representative of the surface of the lower arch form 20.

Further, according to certain non-limiting embodiments of the present technology, the processor 550 can be configured to obtain, based on the 3D digital model 700, for each one of the lower teeth 16, a respective tooth-gingiva segmentation contour, such as a tooth-gingiva segmentation contour 702 of the given tooth 11, indicative of a boundary between a crown portion thereof (not separately labelled) and the lower gingiva 18.

In some non-limiting embodiments of the present technology, the processor 550 may be configured to obtain the tooth-gingiva segmentation contour 702 having been previously generated by third-party software, based on the 3D digital model 700, and data indicative thereof may have been stored in a data format, in which the processor 550 may be configured to receive it, for example, via the input/output interface 580.

In yet other non-limiting embodiments of the present technology, the tooth-gingiva segmentation contour 702 may be generated manually, for example, by the practicing clinician involved in the determining the orthodontic treatment. For example, the practicing clinician may manually apply the tooth-gingiva segmentation contour 702 onto the 3D digital model 700, using respective suitable software, and the processor 550 may further be configured to receive the 3D digital model 700, and detect the tooth-gingiva segmentation contour 702 applied thereon.

In specific non-limiting embodiments of the present technology, the processor 550 may be configured to determine the tooth-gingiva segmentation contour 702 based on analyzing a spatial curvature of the crown portion of the given tooth 11 and the lower gingiva 18 using the 3D digital model 700. More specifically, in this regard, the processor 550 may be configured to apply one of the approaches described in a co-owned U.S. Pat. No. 10,695,147-B1 issued on Jun. 30, 2020, entitled "METHOD AND SYSTEM FOR DENTAL BOUNDARY DETERMINATION", the content of which is hereby incorporated by reference in its entirety.

More specifically, according to certain non-limiting embodiments of the present technology, in order to determine the tooth-gingiva segmentation contour 702, the processor may be configured to: (i) receive the 3D model 700 including a representation of the lower arch form 20; (ii) define, in the 3D digital model 700, around the crown portion of the given tooth 11, a given tooth-gingiva segmentation contour prototype of the tooth-gingiva segmentation contour 702; (iii) for each vertex of a plurality of vertices of the given tooth-gingiva segmentation contour prototype, determine an indication of curvature thereof; (iv) determine, based on the indication of curvature corresponding to the respective vertex, a predicted likelihood parameter for each vertex of the plurality of vertices, wherein the predicted likelihood parameter may indicate a predicted likelihood that a respective vertex corresponds to the tooth-gingiva segmentation contour 702 between the crown portion and the lower gingiva 18; and (v) use the predicted likelihood parameter of the respective vertices to select the vertices defining the tooth-gingiva segmentation contour 702.

Also, as it will become apparent from the description provided below, according to certain non-limiting embodiments of the present technology, the processor 550 may be configured to determine a coordinate system 750 associated with the 3D digital model 700. In one non-limiting example, the processor 550 may be configured to determine the coordinate system 750 as a Cartesian 3D coordinate system whose an XY plane is parallel to a transverse plane associated with a subject's skull (not depicted). In another example, the XY plane may be parallel to a Frankfort horizontal plane associated with the subject's cranium (not depicted).

Further, according to certain non-limiting embodiments of the present technology, the processor 550 can be configured to define, based on the coordinate system 750, along a surface of the lower gingiva 18 in the 3D digital model 700, a signed distance field for further use in determining the open edge 22 for the at least one configuration of the aligner 10.

Figure 8:
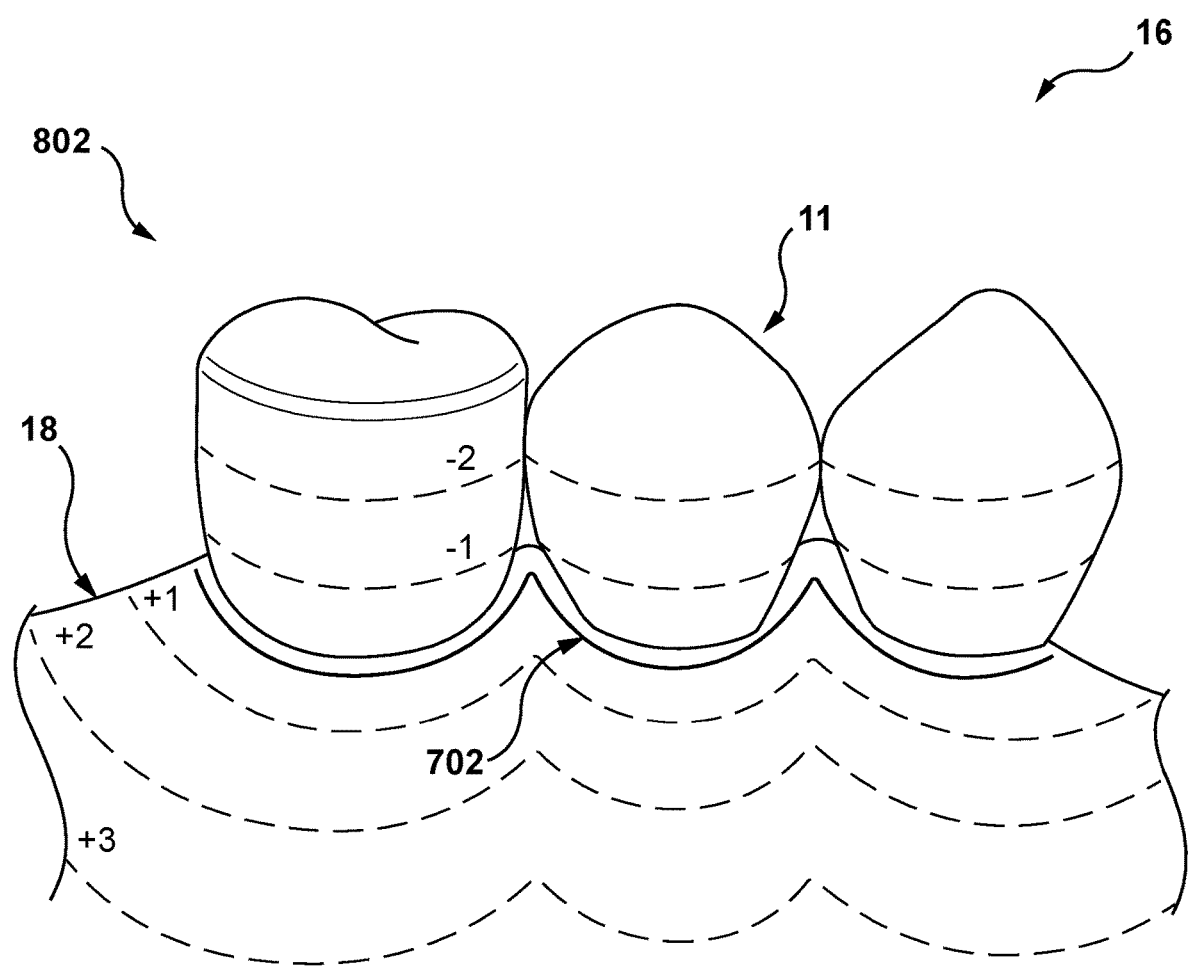
FIG. 8 depicts a schematic diagram of a distance field defined along a surface of the 3D digital model of FIG. 7, according to certain embodiments of the present technology.

With reference to FIG. 8, there is depicted a schematic diagram of a step for determining, by the processor 550, a distance field 802 along a surface of the 3D digital model 700, in accordance with certain non-limiting embodiments of the present technology.

More specifically, according to certain non-limiting embodiments of the present technology, the processor 550 can be configured to determine the distance field 802 by executing the following steps: (i) convert the 3D digital model 700 into a voxel space (not depicted); (ii) assign, to each voxel positioned inside of the lower gingiva 18 in the 3D digital model 700, a respective positive value indicative of a distance of a given voxel to a closest one of respective tooth-gingiva segmentation contours associated with the lower teeth 16, such as the tooth-gingiva segmentation contour 702; and (iii) assign to each voxel positioned outside of the lower gingiva 18 in the 3D digital model 700, a respective negative value indicative of a distance of the given voxel from the closest one of the respective tooth-gingiva segmentation contours associated with the lower teeth 16.

To determine the distances between each voxel and the closest tooth-gingiva segmentation contour for assigning values thereto, in some non-limiting embodiments of the present technology, the processor 550 can be configured to (i) apply a shortest path algorithm, configured to determine a shortest path from the given voxel to the closest tooth-segmentation closest along edges of the plurality of mesh of the 3D digital model 700; and (ii) determine the distances based on the coordinate system 750. Non-limiting examples of the shortest path algorithm can include, without limitation, a Dijkstra's shortest path algorithm, an Euclidean shortest path algorithm, a Floyd-Warshall shortest path algorithm, and the like.

The method 600 hence advances to step 604.

STEP 604: OBTAINING, BY THE PROCESSOR, IN THE CURRENT 3D DIGITAL MODEL, ALONG A SURFACE OF THE GINGIVA, AN INDICATION OF A RESPECTIVE POSITION FOR A GIVEN CONTROL POINT OF A PLURALITY OF CONTROL POINTS, THE PLURALITY OF CONTROL POINTS DEFINING THE OPEN EDGE FOR THE GIVEN ORTHODONTIC APPLIANCE OF THE SET OF ORTHODONTIC APPLIANCES

At step 604, according to certain non-limiting embodiments of the present technology, the processor 550 can be configured to obtain an indication of points along the surface of the lower gingiva 18 in the 3D digital model 700 defining the open edge 22 for the given configuration of the aligner 10 to be applied at the respective stage of the orthodontic treatment.

Figure 9:
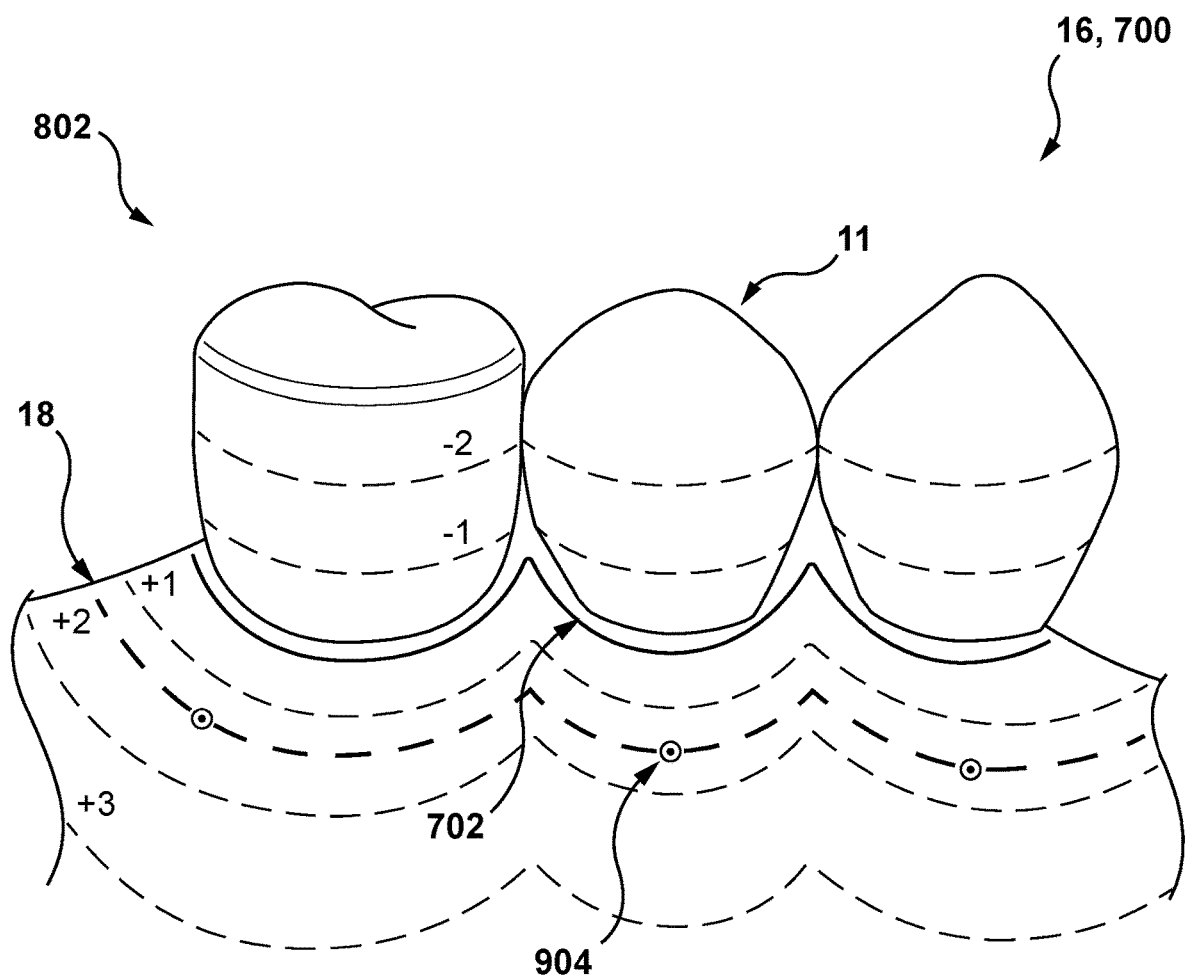
FIG. 9 depicts a side view of a portion of the 3D digital model of FIG. 7 for a step of determining, by a processor of FIG. 5, points defining the open edge of the given one of the plurality configurations the orthodontic appliance of FIGS. 2A and 2B, in accordance with certain embodiments of the present technology.

With reference to FIG. 9, there is side view of a portion of the 3D digital model 700 for a step for obtaining, by the processor 550, a plurality of control points 902 defining the open edge 22 of the given configuration of the aligner 10 in the 3D digital model 700, in accordance with certain non-limiting embodiments of the present technology.

According to certain non-limiting embodiments of the present technology, a given control point 904 of the plurality of control points 902 can be defined as being a point of the lower gingiva 18 corresponding to a predetermined profile change thereof during the orthodontic treatment caused by the tooth movements of the lower teeth 16. More specifically, the given control point 904 can be determined as being a point of the lower gingiva 18, positioned in a vicinity of the given tooth 11, within a predetermined distance value from the tooth-gingiva segmentation contour 702, which would undergo a predetermined level of deformation of the lower gingiva 18, such as stretching and/or compression, caused by the tooth movements during the orthodontic treatment. The level of deformation of the lower gingiva 18 at the given control point 904 thus defines a level of mobility of the lower gingiva 18 thereat, which can be indicated, for example, by a respective predetermined displacement value of the given control point 904 from its current position. A direction for the respective predetermined displacement value is not limited, and in some non-limiting embodiments of the present technology, can include both proximal and distal directions with respect to the lower teeth 16. However, in other non-limiting embodiments of the present technology, the point of the predetermined profile change of the lower gingiva 18 can be determined as a point, caused to be displaced at the respective predetermined displacement value, only in one of the proximal and distal direction with respect to the lower teeth 16. For example, in some non-limiting embodiments of the present technology, the respective predetermined displacement value can be, without limitation, 0.1 mm, 0.5 mm, 1.0 mm, and the like.

However, in other non-limiting embodiments of the present technology, the given control point 904 can be defined as a point of the lower gingiva 18 that displaces along the surface thereof, in response to the tooth movements during the orthodontic treatment, at a displacement value that is no greater than the respective predetermined displacement value.

Further, in some non-limiting embodiments of the present technology, the predetermined distance value from the tooth-gingiva segmentation contour 702 for determining the given control point 904 satisfying the above condition can be, without limitation, 1.0 mm, 1.5 mm, 2.0 mm, as an example.

In some non-limiting embodiments of the present technology, the given control point 904 can be determined as a point of a minimum profile change of the lower gingiva 18 within the predetermined distance value from the tooth-gingiva segmentation contour 702. In other words, in these embodiments, the given control point 904 can be determined as a point of the lower gingiva 18 undergoing minimum deformation, and hence displacing at a minimum displacement value, caused by the tooth movements of the lower teeth 16 in the course of the orthodontic treatment.

Further, it is not limited how the processor 550 can be configured to obtain positions of the plurality of control points 902 defining the open edge 22 of the given configuration of the aligner 10 in the 3D digital model 700. In some non-limiting embodiments of the present technology, the processor 550 can be configured to receive indications of the positions of the plurality of control points 902 in the 3D digital model 700 from the practicing clinician. For example, using the mouse 426 of the computer system 410, the practicing clinician, based on their expertise can, for example, provide the respective positions of each one of the plurality of control points 902 that satisfy one of the conditions mentioned above, such as associated with the predetermined (or minimum) profile change of the lower gingiva 18 during the orthodontic treatment. In other embodiments, the clinician's input can be provided through a touch screen.

However, in other non-limiting embodiments of the present technology, the processor 550 can be configured to determine the respective positions of each one of the plurality of control points 902 automatically. For example, in some non-limiting embodiments of the present technology, the processor 550 can be configured to model, using the 3D digital model 700, the tooth movements of the lower teeth 16 to determine how the profile of the lower gingiva 18 changes in response to the tooth movements during the orthodontic treatment, thereby determining displacements of each vertex of the 3D digital model 700 representative of the lower gingiva 18 in response to the tooth movements. Further, the processor 550 can be configured to identify, in the 3D digital model, vertices of the lower gingiva 18 along the lower teeth 16 meeting one of the above conditions.

It is not limited how the processor 550 can be configured to model the tooth movements to determine the profile changes of the lower gingiva 18. In some non-limiting embodiments of the present technology, the processor 550 can be configured to determine the profile changes of the lower gingiva 18 by solving a harmonic equation describing the surface thereof, as described in a co-owned U.S. Pat. No. 10,751,149-B1, issued on Aug. 25, 2020, and entitled "METHOD OF DETERMINING DEFORMATION OF GINGIVA", the content of which is incorporated herein by reference in its entirety.

More specifically, in these embodiments, the processor 550 can be configured to (i) receive the 3D digital model 700 including the plurality of vertices representative of surfaces of the lower teeth 16, including the given tooth 11, and the lower gingiva 18; (ii) identify a set of shared vertices defining a contour between the given tooth 11 and the lower gingiva 18, the set of shared vertices being representative of both the given tooth 11 and the lower gingiva 18; (iii) apply a tooth-movement displacement to the given tooth 11 in the 3D digital model 700 mesh representing displacement of thereof during the orthodontic treatment, under various configurations of the aligner 10, each vertex of the given tooth 11 being displaced by a same vector to represent rigid movement of the given tooth 11; (iv) apply the tooth-movement displacement to vertices of the set of shared vertices; and (v) determine a vertex-specific displacement for each remaining vertex of lower gingiva 18 in the 3D digital model 700 not belonging to the set of shared vertices by solving a harmonic equation describing a smooth surface of the lower gingiva 18, a boundary condition of the harmonic equation being linked to the displacement of the vertices of the set of shared vertices.

However, it should be noted that other approaches to determining the profile changes of the lower gingiva 18 caused by the tooth movements of the lower teeth 16 can also be used, without departing from the scope of the present technology. For example, in some non-limiting embodiments of the present technology, the processor 550 can be configured to generate, based on the 3D digital model 700, a finite element model (FEM) of the lower arch form 20 simulating mechanical properties of the lower teeth 16 and the lower gingiva 18. Further, the processor 550 can be configured to cause, within the FEM, the tooth movements to the lower teeth 16, prescribed by the orthodontic treatment; and determine the displacements of the vertices of the lower gingiva 18 caused by the tooth movements, indicative of the profile changes of the lower gingiva 18 responsive to the tooth movements.

In alternative non-limiting embodiments of the present technology, the processor 550 can be configured to determine the respective positions for each one of the plurality of control points 902 based on reference data associated with the lower gingiva 18. For example, the processor 550 can be configured to obtain data of profile changes of gingivae of other subjects during various orthodontic treatments those other subjects have received, and based on this data, determine average profile change of the lower gingiva 18 around each one of the lower teeth 16.

Thus, having determined the plurality of control points 902 defining the open edge 22 of the given configuration of the aligner 10, the method 600 advances to step 606.

STEP 606: DETERMINING, BY THE PROCESSOR, BASED ON THE OBTAINED RESPECTIVE POSITIONS OF EACH ONE OF THE PLURALITY OF CONTROL POINTS WITHIN THE CURRENT 3D DIGITAL MODEL, A RESPECTIVE VECTOR OF POSITIONING VALUES FOR EACH ONE OF THE PLURALITY OF CONTROL POINTS

At step 606, according to certain non-limiting embodiments of the present technology, the processor 550 can be configured to determine a respective vector of positioning values for each one of the plurality of control points 902 along the surface of the lower gingiva 18. By doing so, the processor 550 can be configured to determine unique coordinates for each one of the plurality of control points 902 along the lower gingiva 18 for further determining updated positions of the plurality of control points 902 within aligner molds of other configurations of the aligner 10 applied during respective other stages of the orthodontic treatment.

In some non-limiting embodiments of the present technology, the processor 550 can be configured to determine the respective vector of positioning values for the given control point 904 based on distances thereof from the respective tooth-gingiva segmentation contours of the lower teeth 16. More specifically, in these embodiments, the processor 550 can be configured to determine, within each tooth-gingiva segmentation contours associated with the lower teeth 16, at least one anchor point based on which the distances from the given control point 904 to the tooth-gingiva segmentation contours can be determined.

It is not limited how the processor 550 can be configured to determine the at least one anchor point on the tooth-gingiva segmentation contour 702; and according to certain non-limiting embodiments of the present technology, the processor 550 can be configured to determine the at least one anchor point on portions of the tooth-gingiva segmentation contour 702 extending along edges of the given configuration of the aligner 10, that is, on one of a lingual and buccal portion of the tooth-gingiva segmentation contour 702.

Figure 10:
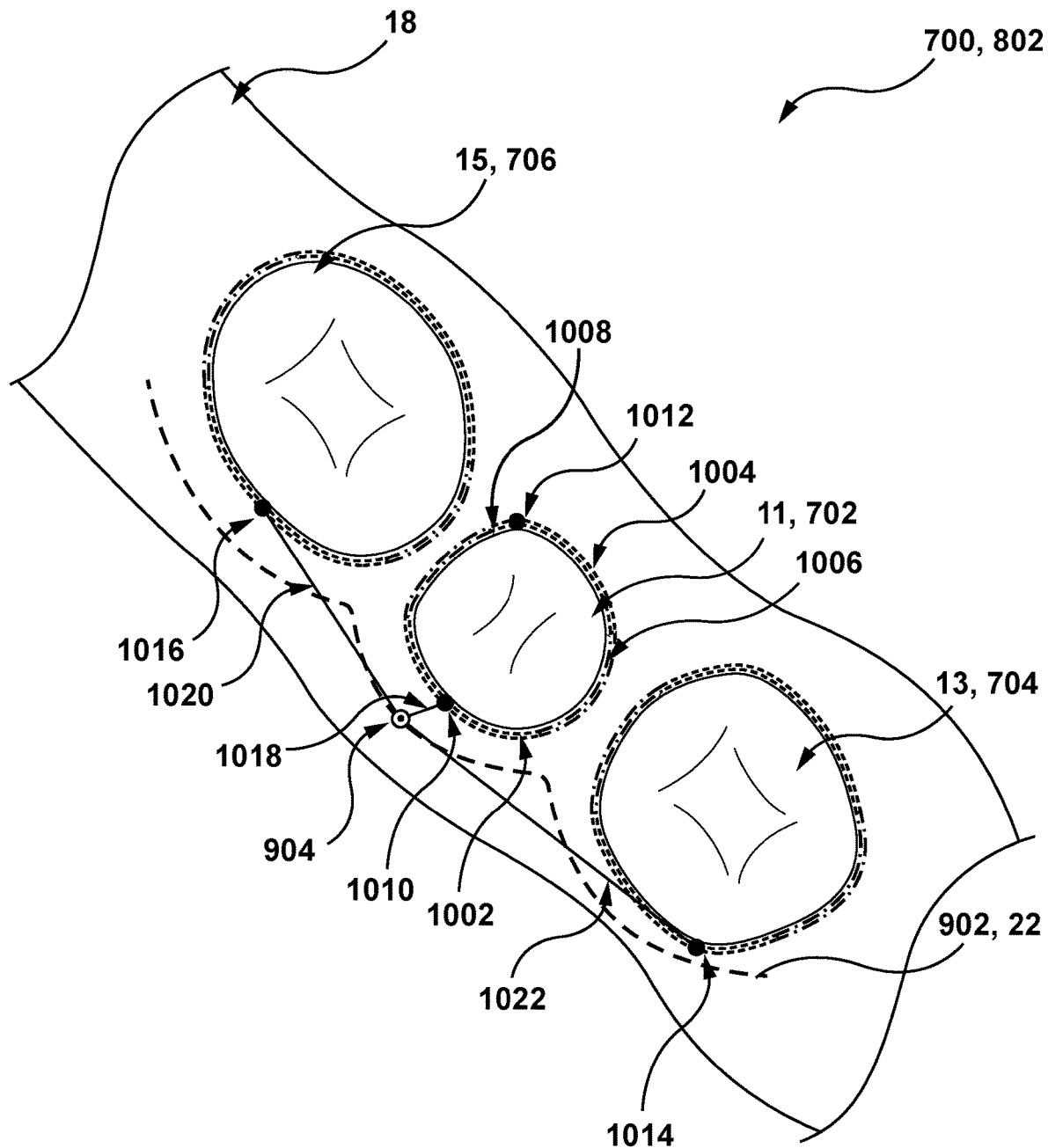
FIG. 10 depicts a top view of a portion of the 3D digital model of FIG. 7 for determining, by the processor of FIG. 5, vectors of positioning values for each of the points defining the open edge of the given one of the plurality of configurations of the orthodontic appliance of FIGS. 2A and 2B along a gingiva of the subject, in accordance with certain non-limiting embodiments of the present technology.
Figure 11:
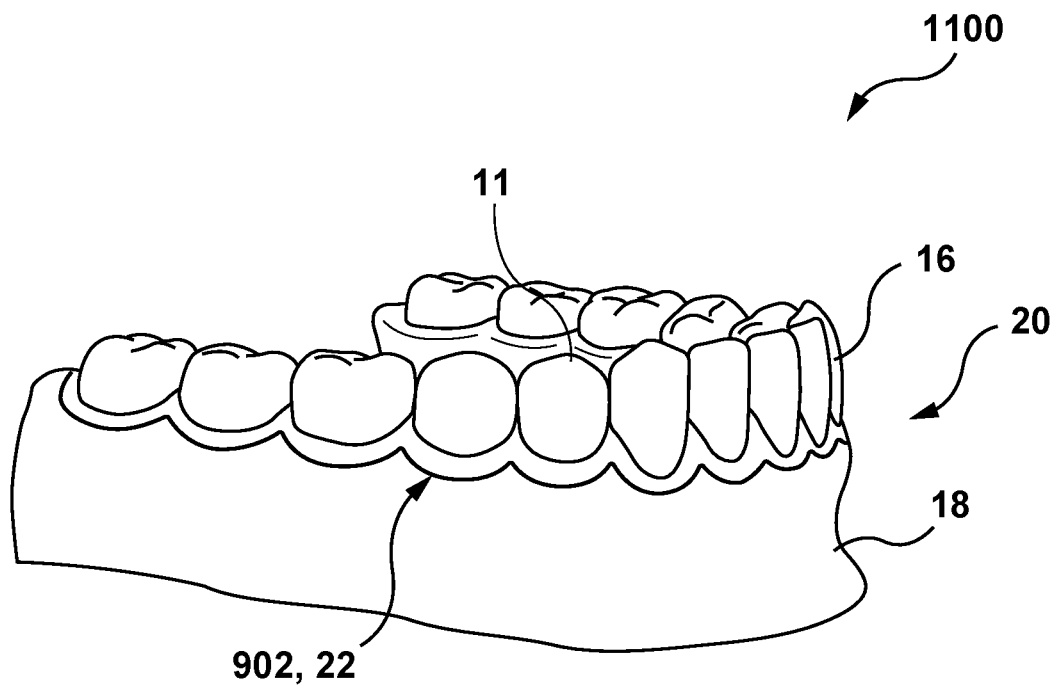
FIG. 11 depicts a perspective view of another 3D digital model of a mold of another configuration of the plurality of configurations of the orthodontic appliance of FIGS. 2A and 2B with a respective configuration of the open edge indicated therein, determined based on the vectors of positioning values, in accordance with certain embodiments of the present technology.

With reference to FIG. 10, there is depicted a schematic diagram of a top view of a portion of the 3D digital model 700 representative of the given tooth 11 and teeth adjacent thereto for a step of determining, by the processor 550, the at least one anchor point on the tooth-gingiva segmentation contour 702, in accordance with certain non-limiting embodiments of the present technology.

According to certain non-limiting embodiments of the present technology, to identify, along the tooth-gingiva segmentation contour 702 associated with the given tooth, a respective labial portion 1002 and a respective lingual portion 1004, the processor 550 can be configured to identify vertices (not separately numbered) of the tooth-gingiva segmentation contour 702 that are closest to each one of a first tooth-gingiva segmentation contour 704 associated with a first adjacent tooth 13 and a second tooth-gingiva segmentation contour 706 associated with a second adjacent tooth 15. To that end, for example, the processor 550 can be configured to (i) determine pairwise distance values between vertices defining the tooth-gingiva segmentation contour 702 and each one of the first and second tooth-gingiva segmentation contours 704, 706; and (ii) determine vertices of the tooth-gingiva segmentation contour 702 associated with the smallest pairwise distance values.

Further, in some non-limiting embodiments of the present technology, the processor 550 can be configured to determine, based on the closest vertices (not separately numbered) of the tooth-gingiva segmentation contour 702 to a respective one of the first and second tooth-gingiva segmentation contour 704, 706, a respective mesial portion 1006 and a respective distal portion 1008 of the tooth-gingiva segmentation contour 702. For example, the processor 550 can be configured to determine the respective mesial and distal portions 1006, 1008 by identifying a predetermined number of vertices of the tooth-gingiva segmentation contour 702 around each of the closest vertices. The predetermined number of vertices thus defining each one of the respective mesial and distal portions 1006, 1008 of the tooth-gingiva segmentation contour 702 can be selected, for example, based on reference data of average lengths of mesial and distal portions of each one of then lower teeth 16 of other subjects. Thus, the remaining portions of the tooth-gingiva segmentation contour 702 are the respective labial and lingual portions 1002, 1004.

However, in other non-limiting embodiments of the present technology, the processor 550 can be configured to determine the respective labial and lingual portions 1002, 1004 of the tooth-gingiva segmentation contour 702 as portions thereof extending along labial and lingual surfaces of the given tooth 11, determined, for example, based on a jaw curve (not depicted) extending through each one of the lower teeth 16, as described in a co-owned U.S. patent application Ser. No. 17/720,409, filed on Apr. 14, 2022, and entitled "SYSTEMS AND METHODS FOR DETERMINING A POSITION FOR AN ATTACHMENT", the content of which is incorporated herein by reference in its entirety.

Further, according to certain non-limiting embodiments of the present technology, the processor 550 can be configured to determine the at least one anchor point, such as a first anchor point 1010 and a second anchor point 1012 of a plurality of anchor points associated with the lower teeth 16 as points of maximum curvature of each one of the respective labial and lingual portions 1002, 1004, respectively. However, embodiments where a given one of the first and the second anchor points 1010, 1012 are determined as corresponding to a minimum or mean curvature of the respective one of the respective labial and lingual portions 1002, 1004 of the tooth-gingiva segmentation contour 702 are also envisioned without departing from the scope of the present technology.

Similarly, the processor 550 can be configured to determine a third anchor point 1014 and a fourth anchor point 1016 of the plurality of anchor points along the first and second tooth-gingiva segmentation contours 704, 706 associated with the first and second adjacent teeth 13, 15, respectively.

Further, based on the so determined plurality of anchor points, the processor 550 can be configured to determine the respective vector of positioning values for the given control point 904 of the plurality of control points 902 defining the open edge 22 for the given configuration of the aligner 10 in the 3D digital model 700.

According to certain non-limiting embodiments of the present technology, the processor 550 can be configured to determine the respective vector of positioning values including at least one of: (i) a shortest distance value 1018 from the given control point 904 to a closest thereto tooth-gingiva segmentation contour, that is, to the first anchor point 1010; (ii) a first distance value 1020 from the given control point 904 to the third anchor point 1014 associated with the first adjacent tooth 13; and (iii) a second distance value 1022 from the given control point 904 to the fourth anchor point 1016 associated with the first adjacent tooth 13. As mentioned hereinabove, according to certain non-limiting embodiments of the present technology, the processor 550 can be configured to determine each one of the shortest, first, and second distance values 1018, 1020, 1022 along the surface of the lower gingiva 18 in the 3D digital model 700 based on the distance field 802, determined at step 602.

In some non-limiting embodiments of the present technology, the respective vector of positioning values associated with the given control point 904 can further include values indicative of relations between at least some of the above-listed distance values. For example, in some non-limiting embodiments of the present technology, such values can include a ratio value between the first distance value 1020 and the second distance value 1022, or vice versa. In some non-limiting embodiments of the present technology, the respective vector of positioning values associated with the given control point can include a ratio value between a given one of the first and second distance values 1020, 1022 and a sum thereof. In these embodiments, the processor 550 can be configured to determine such a ratio value in accordance with a following formula:

$$\frac{d_1}{d_1 + d_2}, \quad \text{(Equation 1)}$$

where $d_1$ is the first distance value 1020, and $d_2$ is the second distance value 1022.

However, it should be noted that various combinations of the above listed distance values for determining other ratio values for inclusion thereof in the respective vector of positioning values associated with the given control point 904 are also envisioned, such as a ratio value inverse to that expressed by Equation 1 and ratio values including the shortest distance value 1018, for example.

Thus, the processor 550 can be configured to determine the respective vector of positioning values for each one of the plurality of control points 902 defining the open edge 22 for the given configuration of the aligner 10.

It should be expressly understood that determining the open edge 22 of the given configuration of the aligner 10 is provided herein for the purposes of clarity of explanation of certain non-limiting embodiments of the present technology; and in other non-limiting embodiments of the present technology, similar steps can be applied, mutatis mutandis, to determine a configuration of an opposing edge (such as that extending along lingual surfaces of the lower teeth 16, not separately numbered) of the given configuration of the aligner 10.

The method 600 hence advances to step 608.

STEP 608: STORING, BY THE PROCESSOR, THE RESPECTIVE VECTOR OF POSITIONING VALUES FOR EACH ONE OF THE PLURALITY OF CONTROL POINTS FOR FURTHER USE IN DETERMINING A RESPECTIVE OPEN EDGE FOR EACH OTHER ONE OF THE SET OF ORTHODONTIC APPLIANCES.

At step 606, according to certain non-limiting embodiments of the present technology, the processor 550 can be configured to store data indicative of the so determined respective vectors of positioning values for each one of the plurality of control points 902 in a memory of the computer system 410, such as the solid-state drive 560.

According to certain non-limiting embodiments of the present technology, the processor 550 can be configured to access the data indicative of the stored respective vectors of positioning values for determining respective configuration of the open edge 22 for other ones of the plurality of configurations of the aligner 10 applied during the orthodontic treatment. More specifically, in these embodiments, first, the processor 550 can be configured to receive another 3D digital model, such as an other 3D digital model 1100, schematically depicted in FIG. 11, in accordance with certain non-limiting embodiments of the present technology, the other 3D digital model 1100 being representative of a desired configuration of the lower arch form 20 for an other stage of the orthodontic treatment, associated with an other one of the plurality of configurations of the aligner 10. Further, the processor 550 can be configured to determine, within the other 3D digital model 1100, new positions of the plurality of anchor points, such as one of the first, second, third, and fourth anchor points 1010, 1012, 1014, and 1016, respectively, as described above at step 606; and based on the respective vector of positioning values, determine a respective new position for the given control point 904 of the plurality of control points 902 relative to the new positions of the plurality of anchor points.

As determined based on the unique "coordinates" (that is, the respective vector of positioning values) along the surface of the lower gingiva 18 in the other 3D digital model 1100, the respective new position of the given control point 904 is thus likely to meet the condition of the predetermined profile change of the lower gingiva 18 therein, described above at step 604. In other words, the respective positioning values allow determining the respective new positions for the plurality of control points 902, corresponding to the predetermined profile change of the lower gingiva 18, without re-modelling the tooth movements at the other stage of the orthodontic treatment.

Further, in some non-limiting embodiments of the present technology, the processor 550 can be configured to (i) apply each one of the plurality of control points 902 in accordance with the so determined respective new positions thereof to the lower gingiva 18 in the other 3D digital model 1100; and (ii) sequentially join the plurality of control points 902 in the other 3D digital model 1100, thereby determining the respective configuration of the open edge 22 for the other configuration of the aligner 10 as a line extending through the plurality of control points 30. It is not limited how the processor 550 can be configured to join the plurality of control points in the other 3D digital model 1100; and in some non-limiting embodiments of the present technology, the processor 550 can be configured to join each one of the plurality of control points 902 by segments of a Bezier curve. However, other curves, such as a quadratic or cubic curve, as an example, are also envisioned without departing from the scope of the present technology.

It should be noted that if the respective new position of the given control point 904 within the other 3D digital model 1100, determined based on the respective vector of positioning values, occurs to be between some of the lower teeth 16, such as between the first and second adjacent teeth 13, 15, as depicted in FIG. 9, due to a significant misalignment of the given tooth 11 inwardly within the lower teeth 16 during the orthodontic treatment, for example, in some non-limiting embodiments of the present technology, the processor 550 can be configured to optimize the respective new position of the given control point 904 such that an optimized position thereof would be outside a space between the first and second adjacent teeth 13, 15, and aligned on the surface of the lower gingiva 18 in the other 3D digital model 1100 with neighboring ones of the plurality of control points 902. To that end, the processor 550 can be configured, for example, to iteratively optimize the respective new position of the given control point 904 such that the optimized position of the given control point 904 is outside the space between the first and second adjacent teeth 13, 15 and the predetermined profile change condition of the lower gingiva 18 at the optimized position of the given control point 904 is met.

Further, based on the other 3D digital model 1100 with the indication of the open edge 22 applied thereto, the processor 550 can be configured to cause the manufacturing system 440 to manufacture the other configuration of the plurality of configurations of the aligner 10 used in the course of the orthodontic treatment.

More specifically, in those embodiments where the manufacturing system 440 is a thermoforming system, the aligner mold for the other configuration of the aligner 10 can be produced, based on the other 3D digital model 1100 with the indication of the open edge 22. Further, as mentioned above, the processor 550 can be configured to cause the manufacturing system 440 to produce the unfinished aligner 300 by thermoforming the preform aligner (not depicted) onto the so produced aligner mold. Further, the processor 550 can be configured to cause (i) the marking subsystem 450 to apply the cut line 304 to the unfinished aligner 300 according to the indication of the open edge 22 on the other 3D digital model 1100; and (ii) the forming subsystem 460 to cut the unfinished aligner 300 along the cut line 304, thereby forming the other configuration of the aligner 10.

However, in those embodiments where the manufacturing system is an additive manufacturing system, the processor 550 can be configured to (i) determine an aligner 3D digital model (not depicted) of the other configuration of the aligner 10 as closely following surfaces of the lower teeth 16 and the lower gingiva 18 in the other 3D digital model 1100 without a portion thereof extending beyond the indication of the open edge 22; and (ii) cause the manufacturing system 440 to print the other configuration of the aligner 10 directly according to the aligner 3D digital model.

In additional non-limiting embodiments of the present technology, the processor 550 can be configured to cause display of one or both of the other 3D digital model 1100 with the indication of the open edge 22 and the aligner 3D digital model (not depicted) of the other configuration of the aligner 10 in the screen 422 of the computer system 410.

The method 600 thus terminates.

Thus, by identifying points along the lower gingiva 18 satisfying the predetermined profile change condition thereof, certain embodiments of the method 600 may allow determining the plurality of configurations of the aligner 10 used in the course of the orthodontic treatment that would have a consistent level of wear comfort for the subject. Also, the method 600 may allow more efficiently determining and further manufacturing the plurality of configurations of the aligner 10 by determining the respective configuration of the open edge 22 for each configuration of the aligner 10 based on the respective vectors of positioning values of the plurality of control points 902.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for determining a configuration of an open edge for an orthodontic appliance of a set of orthodontic appliances, the set of orthodontic appliances configured to be applied to a subject during an orthodontic treatment, the method being executable by a processor of a computer system, the method comprising:
   receiving, by the processor, image data associated with the subject, the image data including:
      a current 3D digital model representative of a current configuration of a surface of a subject's arch form including teeth and a gingiva; and
      data representative of segmentation contours between the teeth and the gingiva;
   obtaining, by the processor, in the current 3D digital model, along a surface of the gingiva, an indication of a respective position for a given control point of a plurality of control points, the plurality of control points defining the open edge for a given orthodontic appliance of the set of orthodontic appliances,
      the respective position for the given control point being determined such that:
         the respective position corresponds to a position on the gingiva undergoing a predetermined change of a profile of the gingiva during the orthodontic treatment, and
         the respective position corresponds to a position on the gingiva which is within a predetermined distance from a given segmentation contour associated with a respective tooth;
   determining, by the processor, based on the obtained respective positions of each one of the plurality of control points within the current 3D digital model, a respective vector of positioning values for each one of the plurality of control points, determining the respective vector of positioning values for the given control point of the plurality of control points comprising:
      identifying, along the given segmentation contour, at least one anchor point of a plurality of anchor points;
      identifying, by the processor, in the plurality of anchor points, a closest anchor point to the given control point;
      determining, by the processor, a distance from the given control point to the closest anchor point;
      storing, by the processor, the respective vector of positioning values for each one of the plurality of control points for further use in determining a respective configuration of the open edge for each other one of the set of orthodontic appliances; and
   causing, by the processor, manufacturing of at least one orthodontic appliance of the set of orthodontic appliances using the respective vector of positioning values for each one of the plurality of control points.

2. The method of claim 1, wherein the determining the respective vector of positioning values for the given control points in the current 3D digital model further comprises:
   determining a ratio value indicative of a ratio between (1) a first distance value from the given control point to a first neighboring anchor point to the closest one; and (2) and a second distance value from the given control point to a second neighboring anchor point to the closest one.

3. The method of claim 2, wherein the ratio value is determined according to an equation:

$$\frac{d_1}{d_1 + d_2},$$

where $d_1$ is the first distance value; and
$d_2$ is the second distance value.

4. The method of claim 1, wherein the identifying the at least one anchor point comprises:
   determining, along the given segmentation contour, a lingual and buccal portions thereof; and
   identifying the at least one anchor point as being representative of a point of maximum curvature of each one of the lingual and the buccal portion of the given segmentation contour.

5. The method of claim 1, wherein determining the distance from the given control point to the closest anchor point is executed, by the processor, using a distance field determined, in the current 3D digital model, along the surface of the gingiva.

6. The method of claim 5, wherein the current 3D digital model comprises a plurality of vertices representative of the current configuration of the surface of the subject's arch form, and the method further comprises determining the distance field along the surface of the gingiva in the current 3D digital model, by:
   determining, by the processor, for a given gingiva vertex representative of the surface of the gingiva, a respective gingiva shortest distance value therefrom, along the surface of the gingiva, to each one of the segmentation contours;
   assigning, by the processor, a positive sign to the respective gingiva shortest distance value;
   determining, by the processor, for a given tooth vertex representative of a surface of a given tooth of the subject, a respective tooth shortest distance value therefrom, along the surface of the given tooth, to a respective segmentation contour associated with the given tooth; and assigning, by the processor, a negative sign to the respective tooth shortest distance.

7. The method of claim 6, wherein determining any one of the respective gingiva shortest distance value and the respective tooth shortest distance comprises applying a Dijkstra's algorithm.

8. The method of claim 1, wherein the obtaining the data representative of the segmentation contours between the teeth and the gingiva comprises determining the segmentation contours based on the current 3D digital model, determining of a given segmentation contour, associated with a respective tooth of the teeth, being based on analyzing, in the current 3D digital model, curvature of at least one of the respective tooth and a portion of the gingiva therearound.

9. The method of claim 1, wherein the position on the gingiva undergoing the predetermined change of the profile of the gingiva during the orthodontic treatment is determined based on gingiva deformation values of gingivae of other subjects having received the orthodontic treatment.

10. The method of claim 1, wherein the position on the gingiva undergoing the predetermined change of the profile of the gingiva during the orthodontic treatment is obtained from an orthodontic practitioner.

11. The method of claim 1, wherein the predetermined change of the profile of the gingiva comprises a minimum change thereof during the orthodontic treatment.

12. The method of claim 1, further comprising:
obtaining, by the processor, an other 3D digital model representative of an other configuration of the subject's arch form during the orthodontic treatment and for which an other orthodontic appliance of the set of orthodontic appliances, different from the given orthodontic appliance, will be used;
determining, in the other 3D digital model, new positions of the plurality of anchor points;
applying, by the processor, based on the new positions of the plurality of anchor points, each one of the plurality of control points to the other 3D digital model according to the respective vector of positioning values;
determining, by the processor, in the other 3D digital model, the respective configuration of the open edge for the other orthodontic appliance as a line extending through the plurality of control points; and
using the other 3D digital model with the respective configuration of the open edge determined thereon for manufacturing the other orthodontic appliance.

13. The method of claim 12, wherein the determining the respective configuration of the open edge comprises sequentially joining, in the other 3D digital model, the plurality of control points applying a Dijkstra's algorithm.

14. The method of claim 12, wherein the determining the respective configuration of the open edge comprises sequentially joining, in the other 3D digital model, the plurality of control points comprises applying a spline function.

15. The method of claim 12, wherein the using comprises:
generating, by the processor, based on the other 3D digital model with the respective configuration of the open edge determined thereon, an orthodontic appliance 3D digital model of the other orthodontic appliance; and
causing, by the processor, 3D-printing of the other orthodontic appliance according to the orthodontic appliance 3D digital model.

16. The method of claim 12, wherein the using comprises:
causing, by the processor, based on the other 3D digital model, manufacture of an orthodontic appliance mold for the other orthodontic appliance;
causing, by the processor, thermoforming of an unfinished orthodontic appliance onto the orthodontic appliance mold;
causing, by the processor, application of the line extending through the plurality of control points and defining the respective configuration of the open edge to the unfinished orthodontic appliance; and
causing, by the processor, cutting the unfinished orthodontic appliance along the line, thereby manufacturing the other orthodontic appliance.

17. The method of claim 1, further comprising causing display of the other 3D digital model with the respective configuration of the open edge for the other orthodontic appliance determined thereon.

18. The method of claim 1, wherein the given orthodontic appliance of the set of orthodontic appliances is an orthodontic aligner.

19. A computer system for determining an open edge for an orthodontic appliance of a set of orthodontic appliances, the set of orthodontic appliances configured to be applied to a subject during an orthodontic treatment, the computer system including:
a processor;
a non-transitory computer-readable medium storing instructions; and
the processor, upon executing the instructions, being configured to:
receive image data associated with the subject, the image data including:
a current 3D digital model representative of a current configuration of a surface of a subject's arch form including teeth and a gingiva; and
data representative of segmentation contours between the teeth and the gingiva;
obtain in the current 3D digital model, along a surface of the gingiva, an indication of a respective position for a given control point of a plurality of control points, the plurality of control points defining the open edge for a given orthodontic appliance of the set of orthodontic appliances,
the respective position for the given control point being determined such that:
the respective position corresponds to a position on the gingiva undergoing a predetermined change of a profile of the gingiva during the orthodontic treatment, and
the respective position corresponds to a position on the gingiva which is within a predetermined distance from a given segmentation contour associated with a respective tooth;
determine, based on the obtained respective positions of each one of the plurality of control points within the current 3D digital model, a respective vector of positioning values for each one of the plurality of control points, determining the respective vector of positioning values for the given control point of the plurality of control points comprising:
identifying, along the given segmentation contour, at least one anchor point of a plurality of anchor points;
identifying, by the processor, in the plurality of anchor points, a closest anchor point to the given control point;

determining, by the processor, a distance from the given control point to the closest anchor point; and store the respective vector of positioning values for each one of the plurality of control points for further use in determining a respective configuration of the open edge for each other one of the set of orthodontic appliances; and cause manufacturing of at least one orthodontic appliance of the set of orthodontic appliances using the respective vector of positioning values for each one of the plurality of control points.

20. The computer system of claim 19, to determine the respective vector of positioning values for the given control points in the current 3D digital model, the processor is further configured to:

determine a ratio value indicative of a ratio between (1) a first distance value from the given control point to a first neighboring anchor point to the closest one; and (2) and a second distance value from the given control point to a second neighboring anchor point to the closest one.

* * * * *